US006576137B1

(12) United States Patent
Ma

(10) Patent No.: US 6,576,137 B1
(45) Date of Patent: Jun. 10, 2003

(54) DIFFERENTIAL AND CONTINUOUS SEPARATION PROCESS WITH CONTROLLED PARAMENTERS FOR SOLIDS AND LIQUIDS

(76) Inventor: Hsien-Chih Ma, 15 Continental Rd., Morris Plains, NJ (US) 07950

( * ) Notice: Subject to any disclaimer, the term of this patent is extended or adjusted under 35 U.S.C. 154(b) by 49 days.

(21) Appl. No.: 09/609,940

(22) Filed: Jul. 3, 2000

Related U.S. Application Data

(62) Division of application No. 09/274,709, filed on Mar. 23, 1999, now Pat. No. 6,280,623.

(51) Int. Cl.[7] .............................................. B01D 15/08
(52) U.S. Cl. ...................... 210/657; 210/659; 210/672; 210/676
(58) Field of Search ................ 210/662, 676, 210/264, 267, 656, 659, 672, 657

(56) References Cited

U.S. PATENT DOCUMENTS

| | | | | |
|---|---|---|---|---|
| 2,617,986 A | * | 11/1952 | Miller | 210/267 |
| 4,280,904 A | * | 7/1981 | Carlson | 210/676 |
| 4,385,993 A | * | 5/1983 | Hedrick et al. | 210/675 |
| 4,758,349 A | * | 7/1988 | Ma | 210/676 |
| 4,764,276 A | * | 8/1988 | Berry et al. | 210/267 |
| 4,808,317 A | * | 2/1989 | Berry et al. | 210/676 |

\* cited by examiner

*Primary Examiner*—Ivars Cintins

(57) ABSTRACT

By regulating separation system's relative parameters, this broad and generalized separation process is disclosed to distinguish the fundament between this invention and chromatography for superior cost-effectiveness. A different mass transfer contacting method and differential set-up between two phases are applied on the disclosed apparatus to achieve purposed efficiency. This continuous separation process can be furnished as the integration of multiple partial fluidized beds or cells; operated under designated pressure level to instantaneous and simultaneous proceeding of determined mass-transfer phenomena. All zones within the process are simultaneously proceeded to isolate one product or multiple products from feed mixtures with other proceeding zones of feeding, impurity stripping, regeneration and washing. The differential mass transfer contact method is disclosed for efficient consumption of both solid phase and mobile phase. The unique recycling technique is disclosed to efficiently reuse the mobile phase and concentrate all isolated components within process. The liquid delivery module and holding tanks are illustrated for increasing operation efficiency and flexibility.

21 Claims, 20 Drawing Sheets

Loading

Elution

DIFFERENTIAL AND CONTINUOUS SEPARATION PROCESS WITH CONTROLLED PARAMENTERS FOR SOLIDS AND LIQUIDS

This is a division of application Ser. No. 09/274,709 filed on Mar. 23, 1999 issued as U.S. Pat. No. 6,280,623 on Aug. 28, 2001.

BACKGROUND OF THE INVENTION

1. Technical Field

This application is an extension of application Ser. No. 25,066 filed Mar. 12, 1987, U.S. Pat. No. 4,758,349. To be more specific, this invention is broadly related to an apparatus and methods to isolate a desired component or multiple components simultaneously, from a solution containing a plurality of mixture components. The apparatus is advanced by its unique construction to convey the novel separation method to leave the native engineering drawbacks of current chromatographic process become irrelevant, such as back mixing and diffusion, axial dispersion, and column end effects. By applying the differential set-up between solid and liquid phase, new mass transfer contacting method, and operation protocols, this apparatus dramatically increases mass transfer efficiency and effectively utilizes packing materials in comparison with chromatographic process under same feeding capacity requirement. The process further controls the system separation parameters to avoid deterioration of separation efficiency due native engineering drawbacks of chromatographic process.

2. Description of Prior Art

The review of prior literature and current survey of commercial chromatography involves with chemically adsorption and de-adsorption interaction of so called mass transfer phenomena between the solid and component mixtures in liquid phase. It indicates the packed or fixed bed batch type columns are the dominant device being widely used for separation. Ever since 1967, the liquid chromatography was first emerged by Huber and Hulsman for faster and easier analytical speed over gas chromatography. Until nowadays that simulated moving bed process employing the embodiments as described in U.S. Pat. Nos. 3,761,533 and 3,201,491 become well known and adopted for such purposes. In those known processes, a chromatographic column is divided into several sections by distributors that allow fluid to flow into or out of each section. Those sections are interconnected in order and continuously circulating fluid stream flowing through all sections by circulating the effluent fluid from an outlet of the last section to an inlet of the first section. At a setting time intervals, all the points of introducing and withdrawing the inlet and outlet streams are shifted simultaneously as same direction of fluid flow; this gives the packing materials a simulated flow in opposite direction of fluid flow. Alternatively, the multiple columns continuous solids and liquids contacting device, as taught by the U.S. Pat. No. 4,522,726 and continuation-in-part-of U.S. Pat. No. 4,522,726 which is U.S. Pat. No. 4,808,317. This device is described by its structure to provide fixed inlet and outlet nipples for introducing and removing fluid streams. The inlet and outlet nipples are interconnected by a rotating columns which are divided into three or four sections, similar to above mentioned simulated moving bed process. By the nature of ratable construction of its member and plural sections, a discrete fluid streams may simultaneously betreated.

All of above mentioned processes comprise certain differences. However, they are all fallen into same categories that apply a stationary packing material within the circular column with an attempt somewhat in manipulating the column configurations and optimization in fluid distribution. The separation is achieved through sequential stages as feed adsorption, selectively desorption to elute impurities and product via specific elution streams, adsorbent regeneration and washing. As thumb of chromatographic operation, the liquid stream is being pushed from one end of column and the existing fluid to emerge from the other end of column. When the fresh feed is delivered, the adsorption of solute components onto the adsorbent occurs. The adsorbent is being consumed and saturated with solutes slowly from one end of the column as feed stream flow direction. At any given instance, the mass transfer is proceeded in a very small trace of adsorbent wherein the mixed zone of two consecutive liquids travels through the bed. The rest of the packing materials are idle for either as saturated adsorbent or waiting to be saturated. The adsorbent is inefficiently being consumed mainly because the idle of most part of packing materials. The same situation is repeated for elution and regeneration stage. In view of unemployed packing materials, the required amount of mobile phase is proportional increased with processing time in which the cycle time engaged for, each consecutive stage are accumulated for stages of feeding, multiple impurity stripping and regeneration. For instance of eluting a particular solute component, the specific fresh eluent is required to push from one end of the column and travel through the entire bed to emerge from the other end of column. This shall be compelled to create dilution of separated fractions due engineering drawbacks, of which often involves with the combined effects of axial dispersion, back mixing, and end effects for fluid in and out of column. Those combined fluid dynamic phenomena have great impacts on product purity and process efficiency such that the feed loading limit is crucial and the separated peaks may often mixed up again with the neighboring peaks. The production rate has to be compromised with purity. Thus, the separation efficiency is low. The mass transfer mechanism justifies the chromatography has natural deficiencies on loading limitation and deteriorating separation, particularly in large industrial separation process. The typical batch chromatographic operation is a tedious process resulting in considerable downtime and often requiring complicated protocols and expensive support systems. The scale up of a typical column process for large-scale purification usually battles with not only the loading limitation for acceptable quality but also requires high-pressure operation and high-energy consumption. Furthermore, the scale up usually is linear procedures from pilot scale through which involves all concerns of not only cost of construction but higher probability of failure.

It is readily understood that the breakthrough of efficient consumption of packing materials not only shall provide a gifted separation process to triumph the native engineering deficiencies of traditional chromatography. It also markedly improves the efficiency of existing separation processes in aspects for low operation cost, low equipment investment, and flexible separation protocols.

SUMMARY OF THE INVENTION

A principle object of the present invention is to provide methods and a corresponding apparatus for continuous separation of combining stages of feeding, impurity stripping, adsorbent regeneration, and washing. The integration of all stages represents a complete separation cycle. It means one stream or multiple streams of products can be simultaneously isolated with multi-impurities stripping through continuous execution of disclosed apparatus. Each separated fraction is simultaneously recovered within a specific zone of the apparatus. Each zone is corresponding to reflect one of the aforementioned stages. Each zone contains one or more than one cell. The cell means a tall chamber installed with adsorbent and acts like a partially fluidized bed or mixed reactor, which receives the fluid from top inlet to instantaneously and partially up lift the adsorbent retained in such chamber. At least one cell is composed as a zone representing a predetermined mass transfer task implemented from the predetermined elution profile of a target separation system. All cells are mounted on a circular plate and can be rotated and stopped for a predetermined rotation angle through a rotating and positioning mechanism. A stationary lower compartment is partitioned into several zone compartments which is located between holding tanks and rotary group of cells for collecting the drained fluids via driving forces of vacuum and pressured gas or air. Holding tanks, located under each zone compartment, are provided as reservoirs for temporary reserving fluids collected from corresponding zones and redistributing fluids for various applications. Vapor recovery units are provided between the main assembly of the apparatus and the corresponding vacuum pump for recovering the fume and reuse the condensed liquid.

Unlike chromatographic operation, the resident resin is stationary and constantly maintained in wet status with surrounding liquid and the fluid is progressively pushed from one end of column and exited the existing fluid out from other end. The elution starts after at least one bed volume due involvement of column dead volume and resin void volume. The main object of the present invention is to create a new mass transfer contact method. It comprises maintaining the resin constantly in semi-dry status, meaning the resin may have wet surface and no liquid exists between resin particles. It is further object by splashing a predetermined volume of liquid from top of cell onto such semi-dry resin for generating a partially fluidization between suspended resin in the liquid phase to instantaneously promoting a homogenous mass transfer contact. It is further object to periodically input the pressure gas or air from top of each cell, in between the ceased liquid delivery, to affiliate in part with continuous vacuum to immediate settle and drain the liquid through the bed. This illustrates the new mass transfer contact method. The method has created a zero dead volume process, meaning the elution starts from the very beginning of bed. Nevertheless, the process has similar elution profile to that of chromatographic operation.

It is a further object of this invention to provide a differential set-up to convert both adsorbent and mobile phase for complete usage of adsorbent and thus obtaining the maximum mass-transfer efficiency between two phases. The conventional chromatographic mass transfer path is parallel to the mobile phase's flow direction and the solid phase is stationary. Inversely, this disclosure continuously and homogeneously exposes the solid phase actually moving in horizontal direction to perpendicularly in contact with mobile phase. It is achieved through swift mass-transfer contact by the implementation of said new mass transfer method and differential set-up between two phases. It is therefore the ultimate object of this invention to dramatic reduction of resin inventory.

It is a further object of this invention to define a new mobile phase input mode to distinguish that from chromatography. The input S-I mode is defined as that predetermined volumes of same mobile phase condition are simultaneously delivered within the minimal time interval into each cell located in same zone. The input I-I mode is defined as that predetermined volumes of discrete increments of mobile phase conditions are simultaneously delivered into each cell located in same zone within the minimal time interval. The differential increments of mobile phase conditions are predetermined between two designate levels that are grouped with each corresponding cell in such zone. The input volume of each discrete mobile phase condition is predetermined and tied in with designated cell in such zone as well.

It is further object of the invention to provide a preferred operation protocol to manipulate the preferred apparatus in conjunction with previous objects to implement the differential set-up and new mass transfer method. The operation protocol includes three preferred operation stages, which are start-upstage, steady state stage, and termination stage.

It is a further object of the invention to provide single-stage recycle for simultaneous isolation and enhancing the concentration level of separated fractions and economic consumption of mobile phase. The collected fluids are temporarily stored in holding tanks located under each corresponding zone compartment of preferred apparatus to recycle back to same zone and/or other neighboring zones to achieve such-purposes.

It is further object of the invention to provide recycle protocol in multiple stages. The multiple-stage recycle is established with the predetermined number of stages arranged in single series or multiple series in parallel to further break down the required volume of feed input. Each stage represents an execution of single apparatus. Through a steady flow of mobile phases travelling vertically within the establishment, it simultaneously carries out the multiple components separation along with the enhancement of concentration level of separated fractions and economic consumption of mobile phases. Yet, it transforms the path of mass transfer interaction from parallel to vertical direction between the solid phase and mobile-phase's flow route whereas the solid phase is partially fluidized to perpendicularly contact with mobile phase. This is fundamental from the characteristic elution profile of a particular separation system investigated under the criterion of said new mass transfer method and differential set-up. The implementation of such elution cycle covering from stages of loading to washing are simultaneously proceeded by the process within every spent of predetermined minimal time interval.

It is further object of the invention to extend to other chemical unit operation constitutes resembling mass transfer behavior through combined application of differential set up, new mass transfer method, operation protocols, and preferred apparatus. The applications are such as catalytic reaction in pack tower and fluidized solid and liquid reaction.

It is further object of the invention to provide a preferred fluid delivered and recycle system to provide easy and adequate process cleaning and sanitation application.

The disclosed invention is achieved by a method for separating one component, or at least one component, simultaneously from plurality of target mixtures. The complete methods are composed of the integration of aforementioned objects and carried out by the apparatus.

BRIEF DESCRIPTION OF THE DRAWINGS

The above and other objects, distinct features and advantageous of the present disclosure can be more readily illustrated from the following description, taken with drawings in which:

FIG. 2b is the blown-up view of preferred two alternatives of rotation and seal mechanism related to FIG. 1 and FIG. 2a;

DETAILED DESCRIPTION OF THE PREFERRED EMBODIMENTS

Figure 9:
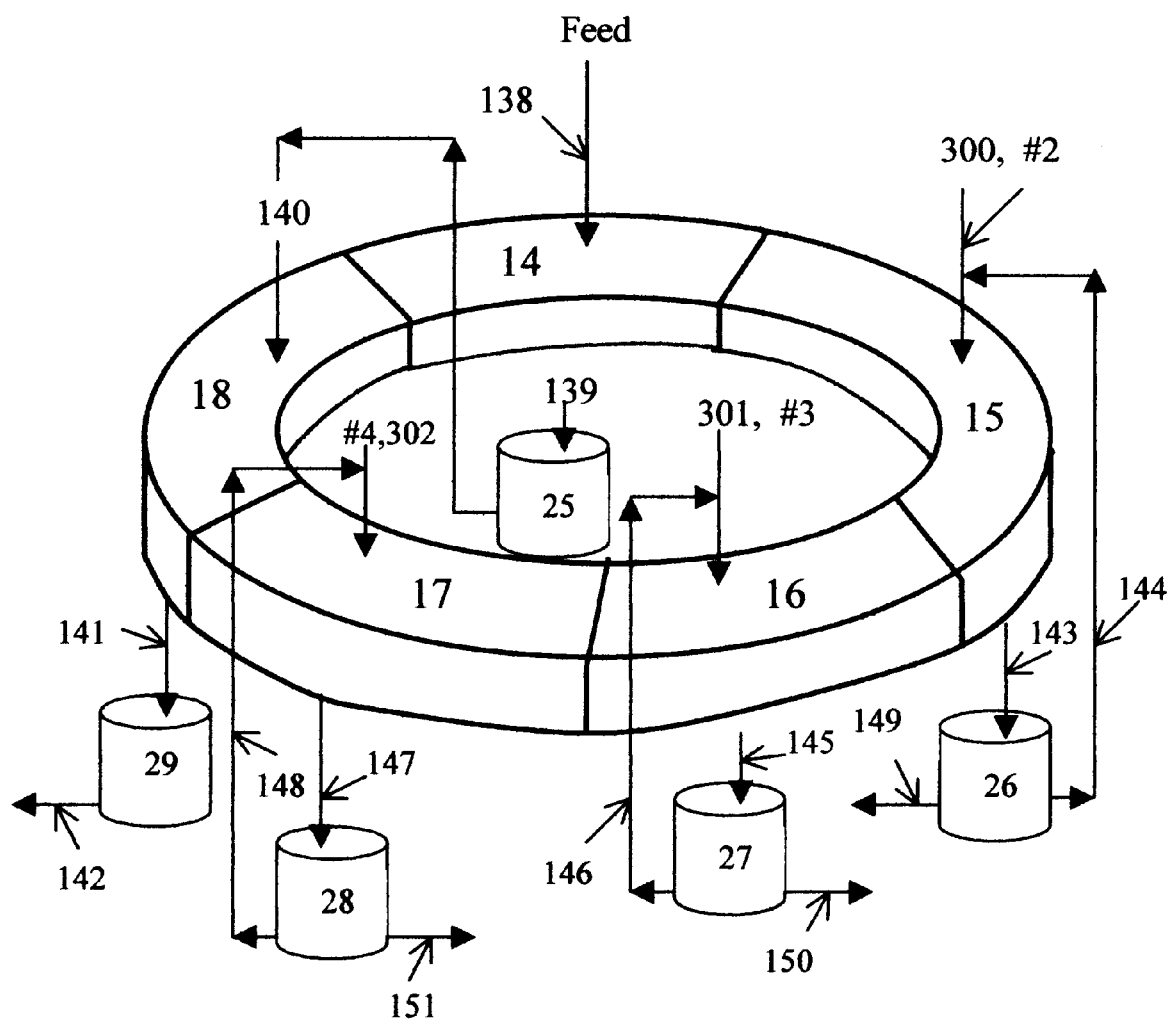
FIG. 9 is a schematic flow diagram representing the single stage recycle protocol.
Figure 10:
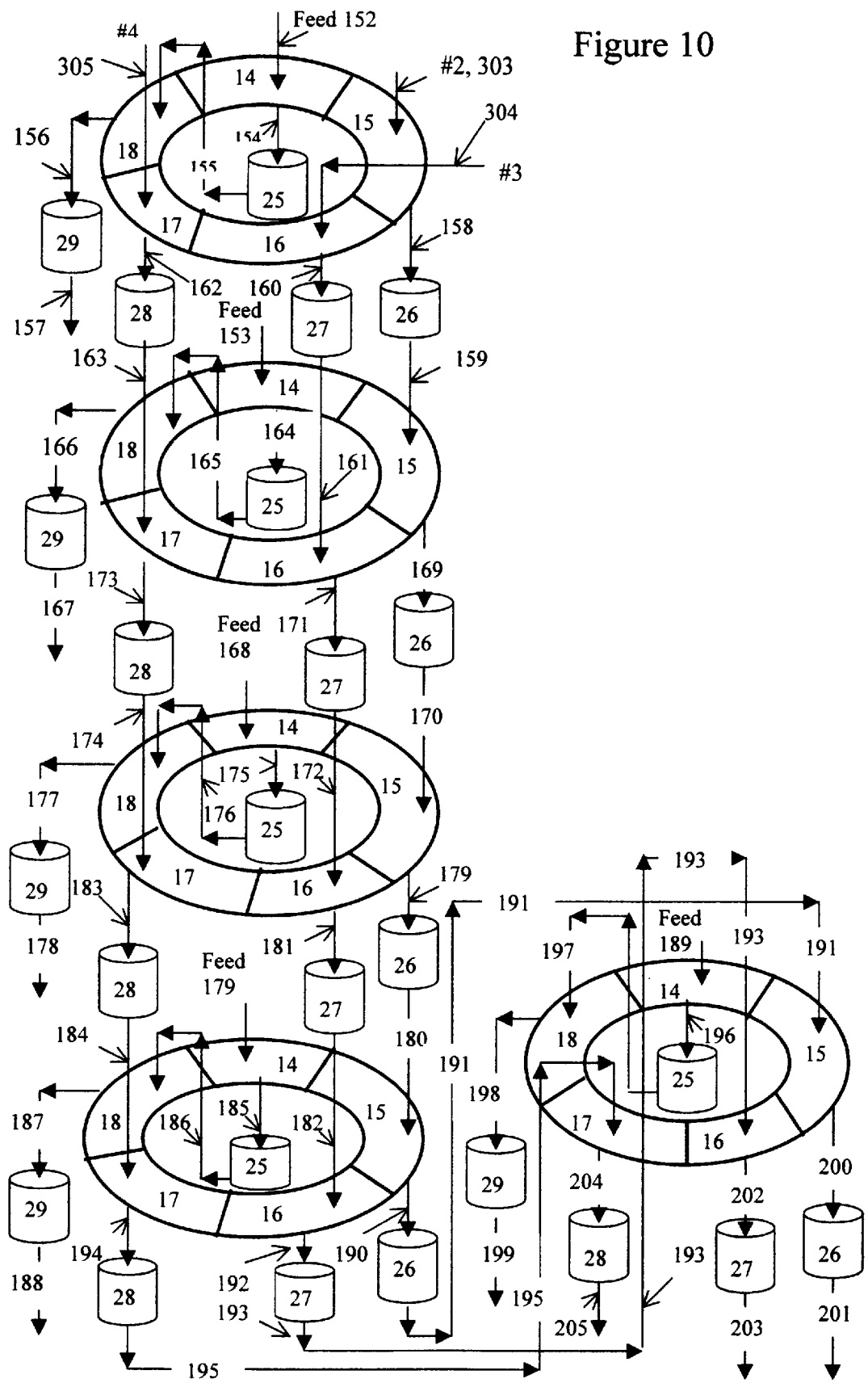
FIG. 10 is a schematic flow diagram representing multiple stages recycle procedures.

This invention includes an apparatus and the integration of new mass transfer method in conjunction with differential set up between two phases and operation protocols to implement the prefixed separation system's parameters onto the apparatus. Both the apparatus and methods are interrelated as hybrid embodiments and illustrated in four descriptive embodiments with aforementioned drawings. The first constituent starts from the preferred apparatus described in FIGS. 1, 2, 3, and 4. The second constituent involves the various mass transfer novelties and methods covered from FIG. 5 to FIG. 8. Then, the FIGS. 1 and 2 are studied again for the implementation of generalized operation protocol. Moreover, FIGS. 9 and 10 are illustrated to introduce the single stage and multiple stages recycle protocols. Finally, experimental data are demonstrated via FIG. 11 through FIG. 18 for numerous advantageous of this disclosure over current column process. It is clear that all drawings and examples are mainly for illustration and possible extent of alternation or configurations of mechanical structures may be explored. Yet, fundamental concept of this invention should set above such possible modification and be within the scope of this invention, mainly because this invention is the hybrid of an apparatus with broad and generalized mass transfer methods.

Figure 1:
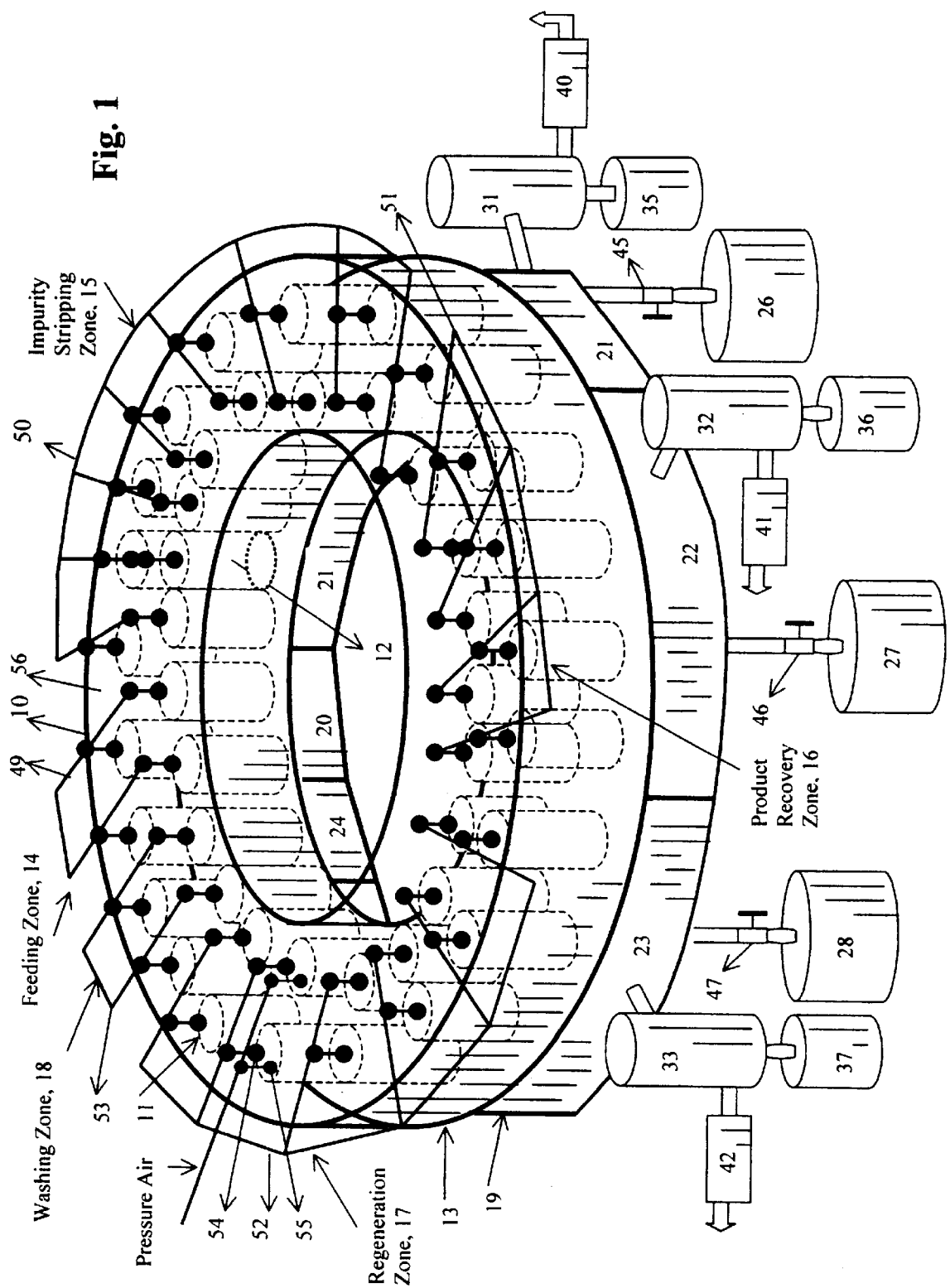
FIG. 1 is the schematic perspective view of preferred embodiment mechanical set up.

FIG. 1 shows the perspective view of the preferred apparatus 10 broadly indicated as the sophisticated separation process. It contains a plurality of cylindrical cells 11, holding a predetermined quantity of packing materials 12, mounted equally in one or multiple layers along the circumference of a circular plate 13. Only two layers of cells are drawn for simplicity. The layer means circumference of different radius from the center of circular plate 13. The micro bead shaped packing materials are classified in various categories and may be any commercially available adsorbent used in chromatography that can chemically and selectively interact with the dissolved components in mobile phase to promote successive separation. The whole group of evenly spaced cells 11 is subdivided into several zones to conduct specific mass transfer task and classified as feeding zone 14 impurity stripping zone 15, product recovery zone 16, regeneration zone 17, and washing zone 18. Certain zone may be further divided, depending on how many extra components are to be simultaneously recovered. An endless circular trough like curved segmental chamber 19 located beneath each corresponding zone is partitioned to cover about same range of cells as zone compartment 20, 21, 22, 23, 24 to collect the fluid drained from such zone. A matching holding tank located under each corresponding zone compartment as tanks 25 (not shown), 26, 27, 28, and 29 (not shown) for temporary storage and redistributing the collected fluid from such zone. Each zone compartment is equipped with a vapor or fume recovery unit 30 (not shown), 31, 32, 33, and 34 (not shown) as means for vapor recovery. The recovered liquid is temporary stored in tank located beneath each corresponding vapor recovery unit as tank 34 (not shown), 35, 36, 37, and 38 (not shown) for future treatment such as filtration and recycled or discarded. Vacuum pumps 39 (not shown), 40, 41, 42, and 43 (not shown) are installed corresponding to each vapor recovery unit as driving force for liquid draining. Solenoid valves 44 (not shown), 45, 46, 47, and 48 (not shown) are located in the connection above each corresponding holding tank. Valves are usually set at closed position to maintain vacuum for liquid draining and switch to open position to coordinate the liquid flow into such tank during the rotation of plate 13. The fluid delivery module composed five manifolds 49, 50, 51, 52, 53 installed in accordance above zones 14 to 18. Fluid is electronically delivered through a solenoid valve 54 located right above each cell 11. Another solenoid valve 55 located next to each valve 54 is for input of pressure air or gas to affiliate vacuum for fluid draining. An endless flattop reversed "U" shape annular channel 56 is installed near vicinity of circumference of plate 13 to cover all cells and provided as supporting platform for mounting all valves 54 and 55. The interior wall of compartment 56 may be modified with either heating or cooling jacket for temperature control, installed with insulation for temperature sensitive operation, or other extended features and configurations for special applications.

Figure 2A:
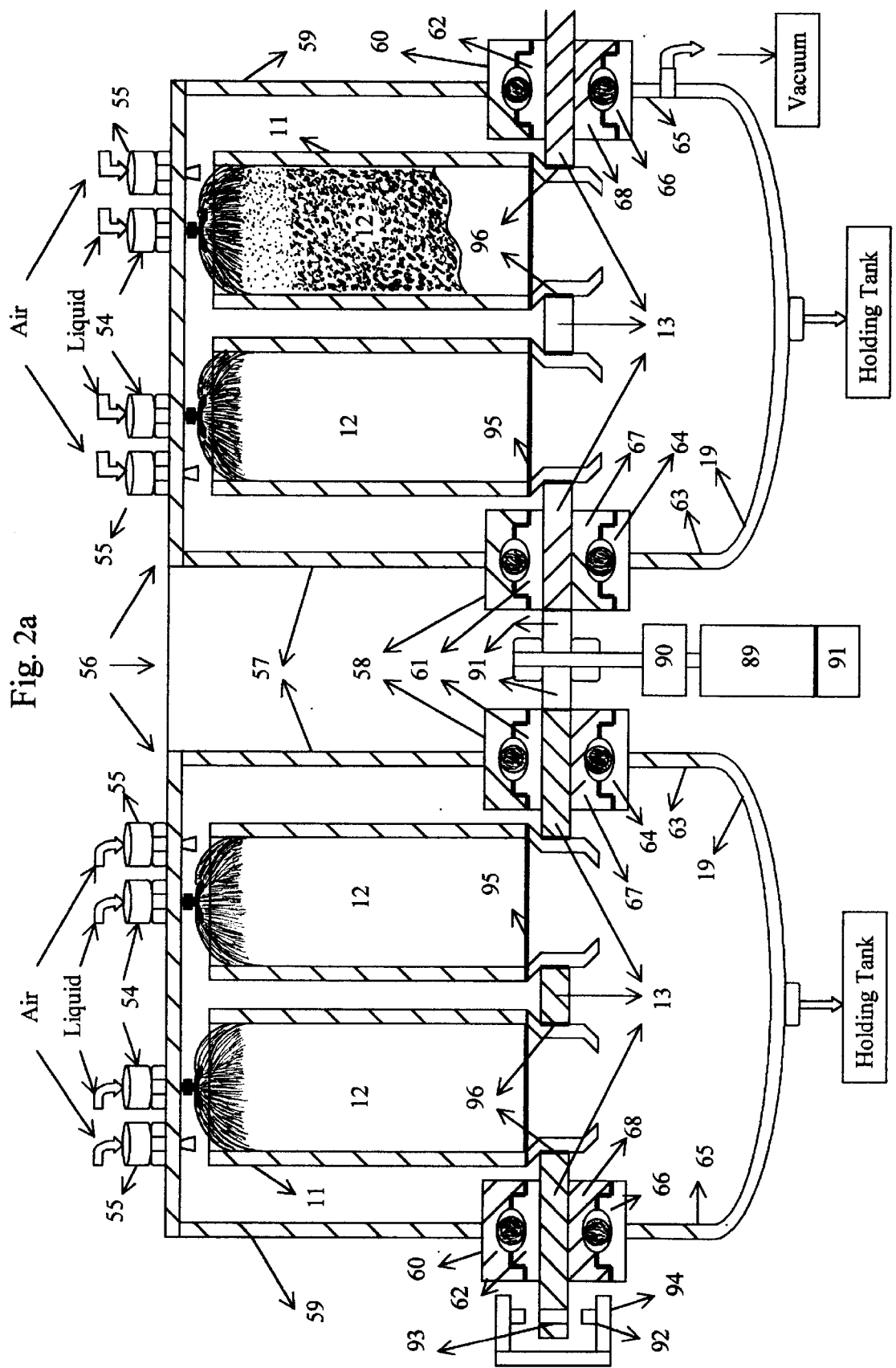
FIG. 2a is the cross-sectional profile of preferred process set up of FIG. 1.

In FIG. 2a indicates the cross-sectional profile of FIG. 1 for illustration of first option of rotation and seal mechanism.

Valves 54 and 55 are mounted on top of each cell 11 and secured at predetermined positions of flattop compartment 56. The compartment 56 has two rims mounted on flat top surface of concentric railings, installed along the central axis. The inner rim 57 is secured on inner-upper railing 58 and outer rim 59 is secured on outer-upper railing 60. A matching inner-lower railing 61 and matching outer-lower railing 62, both have flat bottom smooth surface to be tightly fastened with top surface of plate 13. The curved bottom segmental chamber 19 has similar upright "U" shape annular channel as compartment 56, having two rims attached to two pairs of duplicated concentric railing installed along the central axis. The inner rim 63 is fastened with inner-lower railing 64 and outer rim 65 is fastened with outer-lower railing 66. A matching inner-upper railing 67 and a matching railing 68, both are tightly fastened on lower surface of plate 13.

Figure 2B:
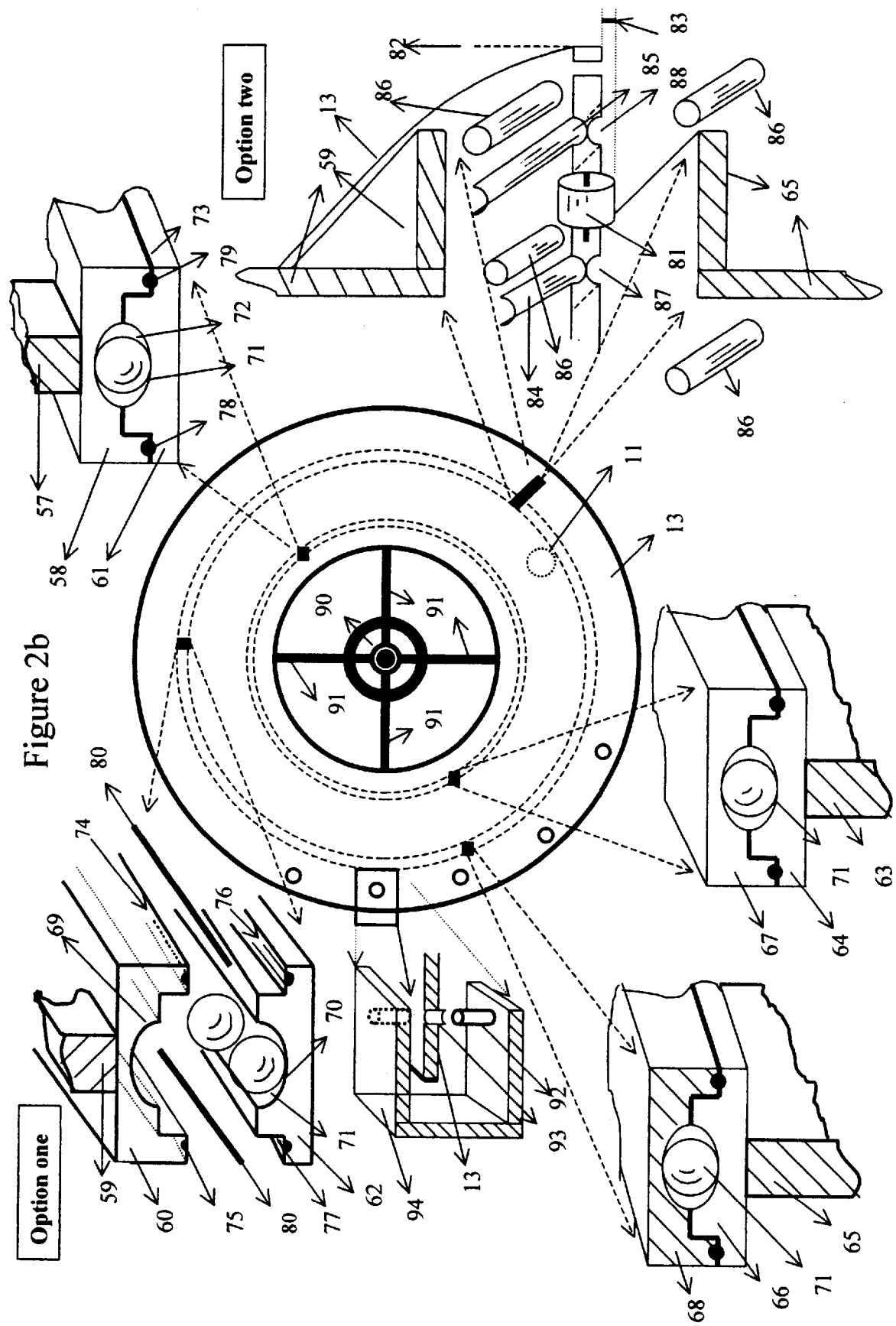

FIG. 2b, the top view of FIG. 1, further illustrates two preferred rotation and seal mechanisms by an exploded profile; and manifolds, solenoid valves, and cells are not shown for readily demonstration. Briefly repeating earlier illustration of first option concerning this figure; rims 57, 59, 63, and 65 represent the part section of compartment 56 and 19. Those rims are tightly mounted on railing 58, 60, 64, and 66 respectively as shown on left part of FIG. 2b by a blown up view. The matching railings 61 and 62 are secured on top-surface, and 67 and 68 are mounted beneath the bottom-surface of plate 13 of which is evenly and horizontally secured in between four pairs railing. For all railings resemble in structure, just the pair of 60 and 62 is illustrated by exploded view for first option of rotation and seal mechanism. Railing 60 has a center down-face half-oval shaped groove 69 to match the center up-face half-oval shaped groove 70 on railing 62. The combination of groove 69 and 70 generates a concentric oval-shaped tunnel 72 as demonstrated by railing pair of 58 and 61. Circular balls 71 with its diameter slightly larger than height of 72 are laid within such that a gap 73 is formed. There have circular grooves 74, 75, 76, 77 to be shaped as concentric circular tunnel 78 and 79 to accommodate O-ring type seal 80 with its diameter just big enough to seal the gap 73. It is clear that the configuration of railings, steel balls, and O-ring seals furnish a sufficient frictionless rotation mechanism for plate 13, providing minimal air leakage for compartment 56 to maintain pressure-air and compartment 19 to hold the vacuum.

A concise rotation and seal mechanism is further illustrated as second option shown on the right side of FIG. 2b and other resembling positions will have same structure with variance in mounting locations. Both compartments 56 and 19 have a concentric flat flange extended as L-shaped rim, viewed from cross-sectional profile. The L-shaped rim 59 is a part of compartment 56 and L-shaped rim 65 been a part of compartment 19. Both rims have identical flange width, which are suitable to support plate 13 in between the compartment 56 and 19. A column shaped bearing 81 with its diameter slightly larger than the cross-sectional depth of plate 13 is symmetrically inset within the plate at direction perpendicular to a imaginary tangent line 82. Such that the bearing 81 is evenly hanged over the surface of plate 13 by a gap 83 to support the compartments 56 and 19. It is recommended to evenly install with at least a multiplicity of four bearings to have good support and rotation capability. Two concentric face-up half-circular grooves 84 and 85 located on upper surface of plate 13 in which two O-ring seals 86 with its radius slightly smaller than gap 83 are installed. Two concentric facedown half-circular grooves 87 and 88 located beneath the surface of plate 13 in which two O-ring seals 86 are installed. The bearings 81 and circular shaped O-ring seals 86 are all installed between the range of flat flange extension of compartments 56 and 19; therefore, the plate 13 can be free to rotate with minimal air leakage.

As referring back to the center part of FIG. 2a, a rotation and positioning mechanism is provided through a center mounted position motor 89 equipped with a speed reducer; usually gearbox 90 and a motor brake 91. Motor 89 rotates the plate 13 via stretch bars 91 with all cells 11 mounted on plate 13 in clockwise or otherwise in counter-clockwise direction. The direction of rotation and the range of one rotation step are preset and remain unchanged for one cell at a time or more than one cell as a group. As shown from FIG. 2b, the range of predetermined rotation step is controlled by a light sensor 92 via evenly drilled holes 93 near the circumference of plate 13. The distance between two adjacent holes 93 represents the range of a rotation step. The light sensors 92 mounted face to face on bracket 94 constantly emits light beam, which is blocked by plate 13 when the plate 13 is moving. Initially, the motor 89 receives the signal from the controller to energize and rotate the plate 13 forward. The plate 13 continuously rotates forward until the light sensors detect the light beam through hole 93 in order to de-energize the motor and concurrently initiate the motor brake 91 to halt the motor and movement of plate 13. It shall be understood that there is no limitation of other alternatives of motion control systems such as actuator or servomotor can be applied for such purpose.

Figure 3:
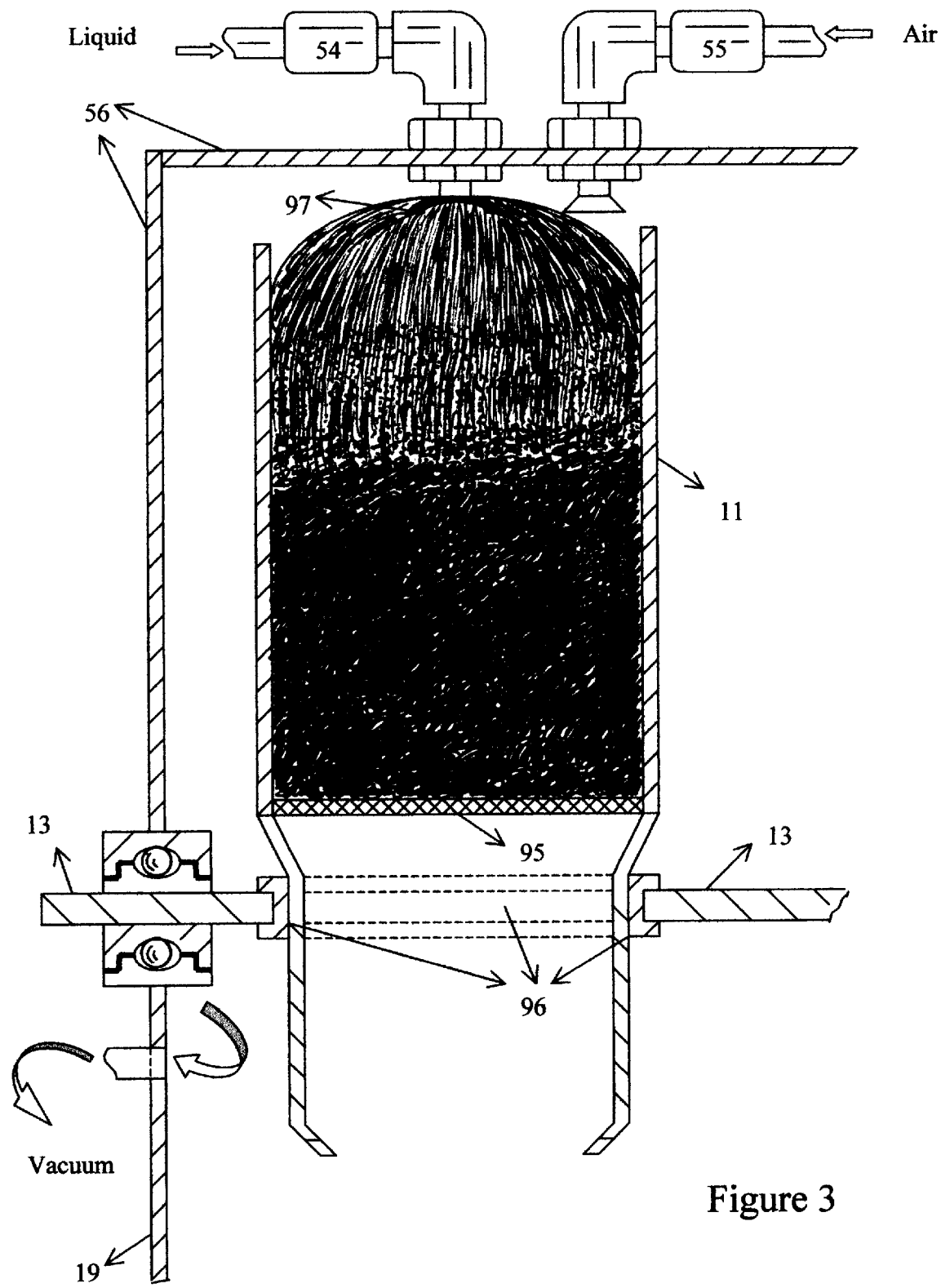
FIG. 3 is the general perspective view of preferred cell construction for implementation of instantaneously partially fluidized effect between resident resin and upcoming fluid; particularly for single type resin.

The preferred construction of cell 11 shown in FIG. 3 is the essential element to implement the new mass transfer method and to distinguish this disclosure from chromatography. The cell is a tall cylindrical container retaining a predetermined quantity of resin by a porous filter 95, which has porous mesh small enough to prevent resin from being drained while to maintain good permeable capability. The cell has an outlet opening mounted by a seal gasket 96 on plate 13. The vacuum is constantly engaged to maintain the resin in semi-dry status; meaning the resin may have wet surface but no liquid exists among resin grains. As previous illustration of rotation and positioning mechanism, all cells 11 rotate one-rotation step and align to each cell's center position. The outlet end of solenoid valve 54 has a less than 180 degree baffle 97 to conduct the predetermined volume of fluid to splash over like an umbrella shape. The splashed fluid hit the container wall, and slide downward to penetrate and partially up-lift the grains of resin suspended in liquid. This instantaneous partial mixing effect is for quick contact and dramatic reduction of required time for mass transfer between two phases. Soon after the liquid deliver is completed, the pressure air or gas is released via solenoid valve 55 in part with external vacuum to immediately settle the bed. The drained fluid penetrates through the remaining of the bed to complete mass transfer contact. Note that the fluid is drained means the solid phase returns to its initial semi-dry status throughout the whole bed. Thus, it distinguishes the new mass transfer contact method from chromatography. The minimal time required for completing the new mass transfer method including liquid delivery to fluidize bed, settled and drained the fluid, and advance one rotation step is defined as minimal time interval, $\Delta t$. This time interval is the mechanical limitation of the apparatus for liquid delivery and liquid draining and is the fundamental parameter for converting chromatography into present invention. Preferably, the draining driving force has no limit of combinations through other forms. The primary purpose is to affiliate the draining speed.

Figure 4:
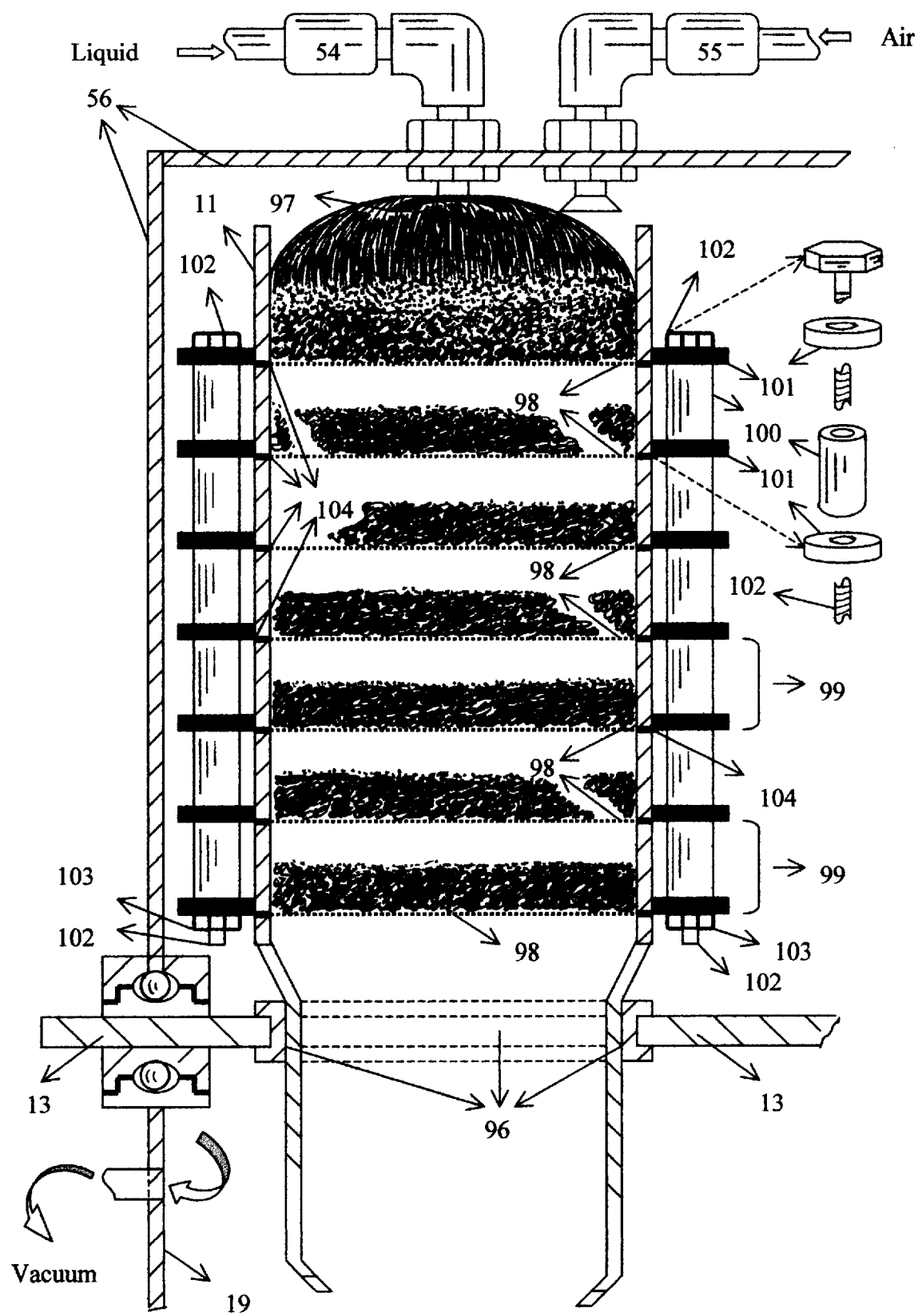
FIG. 4 is the general perspective view of preferred cell construction for single type of resin in multiple layers, or multiple kinds of resin in multiple layers.
Figure 5:
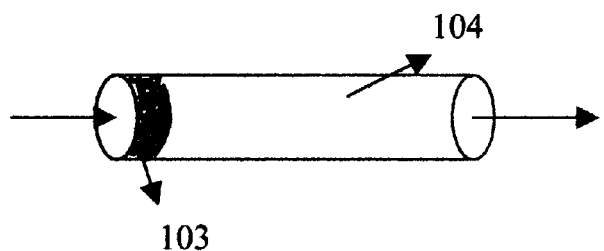
FIG. 5 is the schematic illustration of three input modes in chromatographic operation and their outcome of loading and elution stage.
Figure 5:
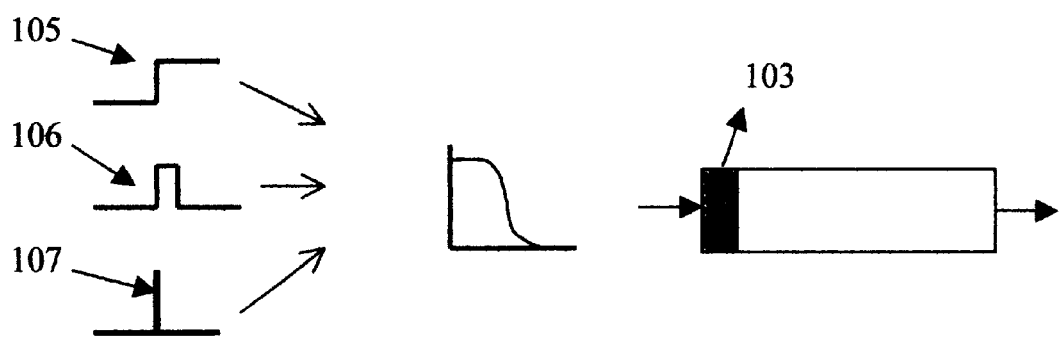
Figure 5:
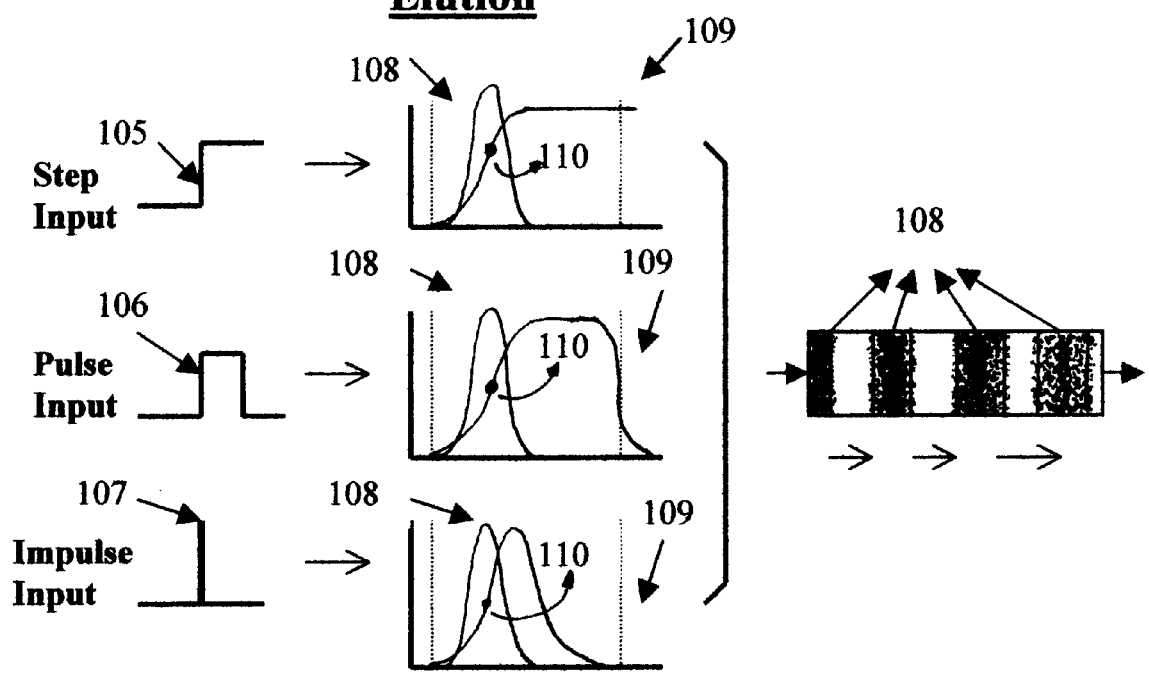

The predetermined quantity of one type of resin may be subdivided into more than one thin layer to affiliate better liquid permeable capability throughout the cell if pressure drop is too high. As shown in FIG. 4, each thin layer of resin is, supported by its own porous filter 98 in each shallow bed 99. The total height of individual shallow bed 99 comprises of a depth of resin and an opening space above. Each layer of resin has a porous filter 98 to support such resin as the fluid outlet of current layer and the predetermined open space as the fluid inlet of next layer. As shown by exploded view located on rightside of FIG. 4, each bed 99 is equally stacked up with such predetermined interval and supported by a metal tube 100 stacked in between mounted washer 101. The position of washer 101 is located at bottom of each bed 99. A threaded metal rod 102 with stud is pierced from top through all tubes 100 and washers 101 and secured by a nut 103 to connect all the shallow beds 99 in series. The outmost part of filter 98 has an extended and built in rubber annular shape gasket 104 with filter (only shown as cross-sectional cut), which is tied in between individual bed 99 to prevent air and liquid leakage. The stacked up structure of all beds with an open space in between individual bed reduces the pressure drop to minimal.

The advanced cell construction is further expanded to accommodate multiple kinds of resin via multiply-layer set up. The multiple-layer set up means a cell construction is as shown as FIG. 4. The multiple kind of packing materials means that more than one type of resin is packed in different zones of the cell construction. The zone means a grouped number of layers 99 arranged as a zone interval within cell body to accommodate one type of resin and additional zone for additional kind of resin. All zones are constructed in series to vertically affiliate fast draining via vacuum and pressure-air. Multiple kinds of resin can be any combinations of anion exchanger, cation exchanger, reverse phase resin, normal phase resin, activated carbon, or other types of packing material can chemically interact with mobile phase to have adsorption and de-sorption capabilities. One fluid spraying baffle 97, similar to that shown in FIG. 3, is installed at top of cell body to deliver fluid into first layer of cell. It allows a specific fluid with multiple compositions of dissolved solutes to interact with each zone's resin to complete mass transfer interaction as the fluid drained throughout the cell body. The mass transfer interaction means either adsorption and/or de sorption phenomena shall be proceeded between liquid phase and multiple kinds of resin within the predetermined minimal time interval, $\Delta t$. The minimal time interval is same as formerly defined.

As previous illustration of chromatographic operation, the feed solution is pushed from one end of column to promote adsorption of solute components onto the resin and simultaneously push out the existing mobile phase out from the other end of column. As shown in upper part of FIG. 5, the dark region 103 represents the resin been saturated and progressively increases as the feed input is prevailing in time domain. The unclouded area 104 represents the fresh resin that is not been saturated with feed stream. As shown by loading stage in middle part of FIG. 5, three input modes named as step input 105, pulse-input 106, and impose input 107 generate same result as earlier illustration. The shaded area 103 is named as mass transfer zone abbreviated as MTZ, and a fresh zone 104 remains unsaturated. The zone 103 in general occupies 5–15% of total bed volume and unused resin in zone 104 is soaked with liquid.

The feed input is stopped and then switched to various conditions of elution liquid. The incoming fluid, in form of three input modes as shown in lower part of FIG. 5, will push the existing fluid out of the column. The conjunction zone 108 of two mixing fluids as indicated as transient profile 109, representing the condition of mobile phase, is progressively changing from feed toward elution liquid. Note that this transient curve 109 starts from the very beginning of column in which the adsorbed solute components original in feed. Now, they have been selectively departed from resin along with time prevailing and returned to such elute liquid (mobile phase). The highest peak of eluted component (only one is shown for illustration) points to its specific corresponding mobile phase parameter namely as iso-point 110, at which the adsorbed solute starts to department from resin to return to mobile phase. In reality, it asserts an equilibrium status between solid and mobile phase that the adsorbed solute component will not depart from its bounded site unless its surrounding mobile phase is favorable for such phenomena to occur. It means every solute component has its own unique equilibrium status that only allow such solute component to be eluted from bonded status to mobile phase. It means a neutral equilibrium point has to be triggered for each component prior to its elution. This fact relates to all adsorbed components that each one may depart from resin only if the surrounding mobile phase condition exceeds its neutral point despite flow dynamics near by.

From the above iso-point teaching, this invention utilizes identical mobile and solid phases used in chromatography to proceed the separation through mixing or fluidized effect by controlling the mobile phase's condition to contact with solid phase. It means through said new mass transfer method and impending illustration of differential set-up between two phases and operation protocol, implemented on said apparatus, can obtain maximum separation efficiency within every spent of minimal time interval, $\Delta t$.

The optimal relationship between optimal resin quantity required for a fixed volume of feed solution is determined by gradually adding and mixing the resin into such feed solution to promote solute components been adsorbed onto the resin. The optimal resin quantity means the exact amount of semi-dry condition resin is added to a fixed volume of feed solution to promote at least one and/or all solute components been completely adsorbed. The current invention implements the optimal relationship in proportion with the throughput requirement of feed solution in terms of exact amount resin for complete saturation with such throughput. It means the resin installed in each cell of apparatus is equivalent to the mass transfer zone 103, formerly defined MTZ, which is the zone of resin been saturated with the predetermined throughput in chromatography.

Figure 6A:
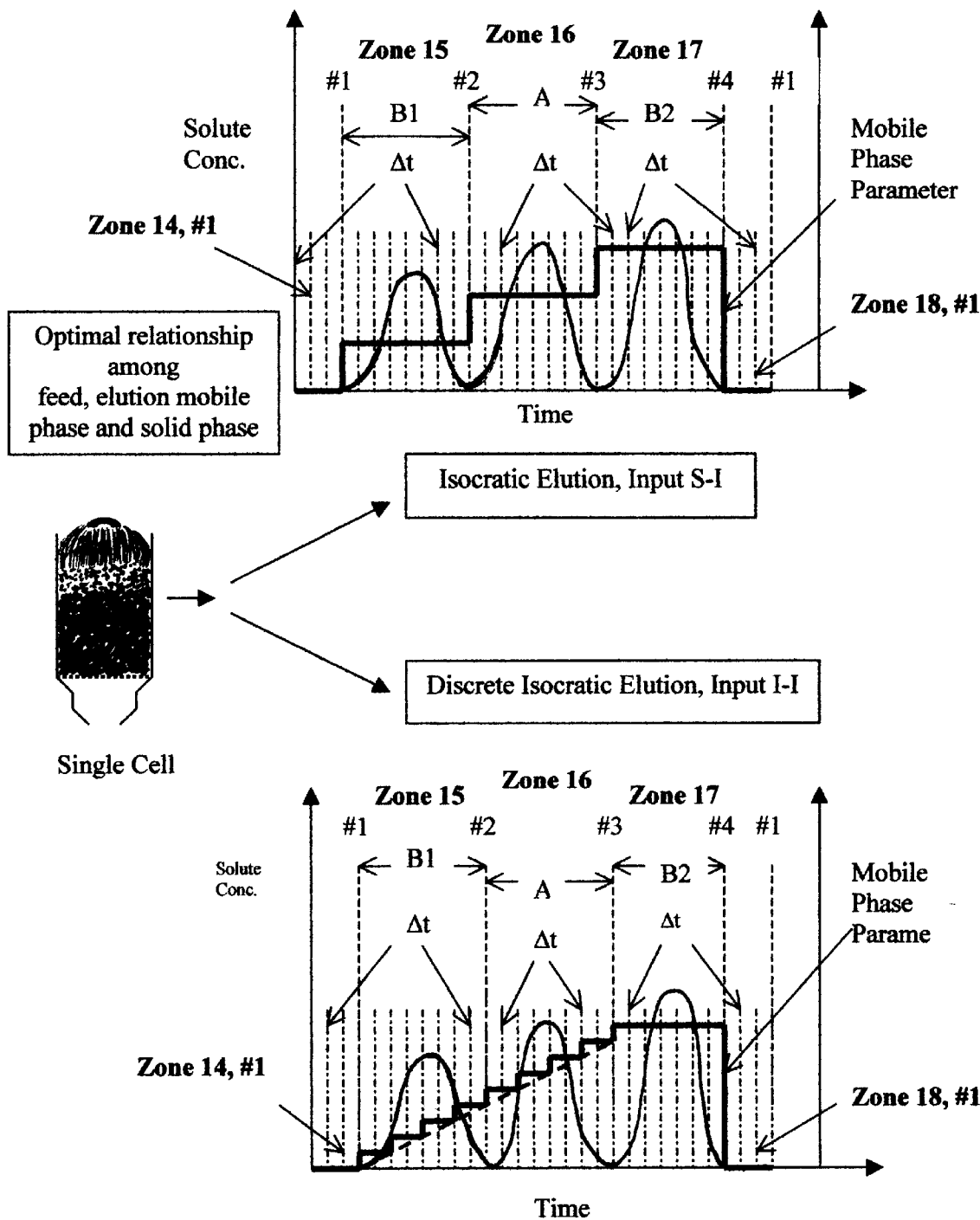
FIG. 6a is the method to implement for continuous and simultaneous isolation of single product A and the two groups of impurities B1 and B2.

For establishing a generalized differential set-up for any target system, it requires to produce an elution characteristic profile from a single cell by applying the new mass transfer contact method as described in FIG. 3 and/or FIG. 4. The FIG. 6a shows two modes of schematic elution diagrams produced by this method. It is plotted by the solute concentration on left-Y-axis and mobile phase parameter on right-Y axis, both vs. time on X-axis. Both modes represent a generalized profile covering zones of feeding 14, impurity stripping 15, product recovery 16, regeneration 17, and washing 18; each zone is corresponding to said apparatus in FIG. 1.

The first mode is called isocratic elution, input S-I. It is completed by five step-input 105, as defined in FIG. 5 with five running conditions. By nature, the step input 105, is for interpretation of running condition prevailed in time domain. As described in FIG. 3 and/or FIG. 4, the small dose of liquid phase is delivered and sipped throughout the cell before another dose is delivered. The type of liquid input interpreted in time domain is actually as a form of impulse input 107 as described in FIG. 5. The duration of liquid input in time domain is reduced to as small as possible, corresponding to the defined minimal time interval Δt. Therefore, the definition of liquid input for the present invention is preferable described as step input in running condition but with impulse input in time domain, which is denoted as input S-I. Mainly because the definition of step input for chromatography is not appropriate.

The second mode of input is called discrete isocratic elution, input I-I. It is completed by inputting a group different mobile phases with minor increment of running parameter. The minor increment of running parameter is defined as little change as possible and carried out within a minimal time interval Δt. It means an impulse input is defined for both running condition and time, which is denoted as input I-I. The duration of a minor increment of running parameter may be equivalent to one or multiple minimal time interval, which is de pending on target separation system. By proceeding the input I-I is purposely for maximizing the elution of current group and minimizing the elution of subsequent group to avoid the co-elution because the iso-points of two adjacent groups are close to each other. The integration of both minor input volume and its corresponding minimal time interval Δt for either input S-I or input I-I, which is equivalent to total input volume executed under total time duration. Therefore, the previous-illustration fore said apparatus makes the input S-I and input I-I possible to be distinguished from chromatography. In general, input I-I is not required unless a better separation is demanded.

An illustrative elution profile for input S-I by sequentially starting from mobile phase #1 (feed condition) through #2, #3, to #4 creates three peaks plotted in solute concentration (left-Y-axis) vs. time domain and mobile phase parameter (right-Y-axis) vs. time domain. The first step is feed loading, #1, onto fresh resin proceeded in loading zone 14 to obtain the maximum adsorption efficiency; meaning to spend shortest possible tithe for maximum feed stock throughput. All conditions of subsequent elution liquids are predetermined according the previous teaching of iso-point belief. The mobile phase condition is predetermined that #2 condition is preset prior to the iso-point of desired product A, thus, only impurities B1 can be eluted. This covers the impurity-stripping step proceeded in impurity-stripping zone 15. Then, #3 mobile phase has its condition just elutes the desired product A and retains the impurities group B2 in solid phase. It covers the product-recovery step proceeded in product-recovery zone 16. The #4 condition is input to cover elution of impurities B2 as regeneration step proceeded in regeneration zone 17. Finally, the washing step is proceeded in washing zone 18 by recycling of #1 mobile phase collected from feed zone to prepare resin ready for loading again.

The input I-I is illustrated by starting from feeding step to obtain the maximum adsorption efficiency proceeded in feeding zone 14 with #1 mobile phase. The impurity-stripping step is proceeded in impurity-stripping zone 15 by input I-I, minor increment of mobile phase parameter starting from #1 then ending by #2, to maximize the elution of first impurity group B1 to avoid co-elution with product A. The product recovery step is proceeded in product recovery zone 16 by input I-I starting #2 then ending #3 mobile phase parameter for maximizing the elution of product A to avoid co-elution with $2^{nd}$. Impurity group B2. Generally, one increment of mobile phase parameter is sufficient for each increment of minimal interval Δt. Once the product A is eluted, the regeneration step is proceeded in regeneration zone 17 by input S-I #4 mobile phase to strip off $2^{nd}$. Impurity group B2 from solid phase. Finally, the washing step is proceeded in washing zone 18 by input S-I with #1 mobile phase recycled from zone 14 to prepare resin ready for zone 14 adsorption. Note that the resin in both modes of input S-I and input I-I is always maintained in semi-dry status in accordance with the criterion of new mass transfer method via vacuum and/or pressure air. Chromatography involves void volume that the front part of the peak will not emerge from other end of column until all existing mobile phase in column is completely pushed out. The current elution profile consumes exact amount of resin and such profile starts from the beginning of bed, meaning that zone 104 does not exist in comparison with chromatography. Yet, the said cell in apparatus has no dead volume at all in fluid delivering system. Note also from the previous illustration that zone 104 in chromatography not only contributes nothing but also deteriorates the separation.

Figure 6B:
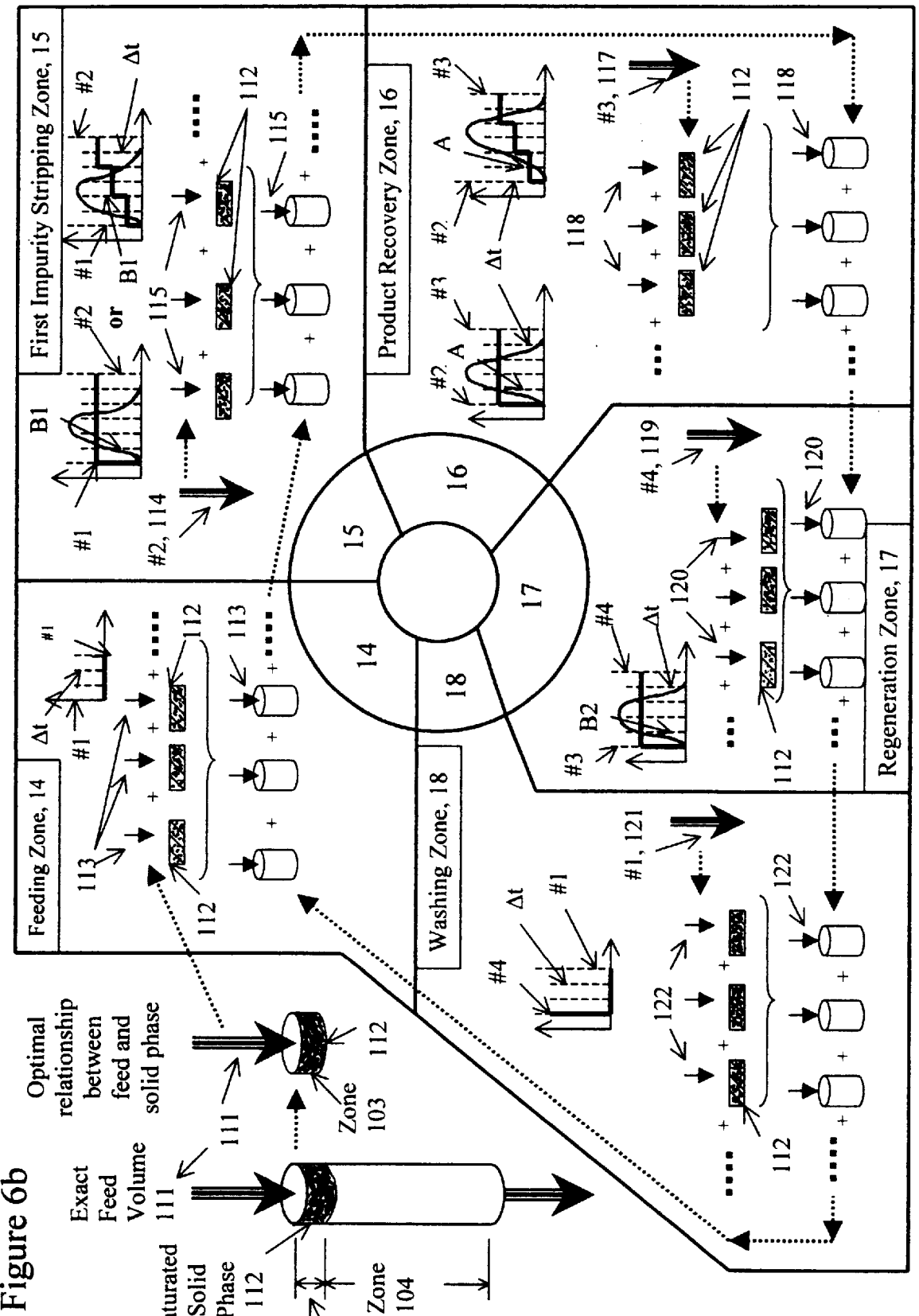
FIG. 6b is a generalized scheme to carry out the differential set up.

For easier illustration of differential set-up between two phases onto said apparatus, the apparatus is simplified as an annular ring in the center of FIG. 6b. The schematic drawing indicates the preferred apparatus is divided into five parts corresponding to the feeding zone 14, first impurity stripping zone 15, product recovery zone 16, regeneration zone 17, and washing zone 18, respectively. The variance in size of different zones shown in the annular drawing is intended to reflect the realistic time may actually be required for completing the mass transfer contact for specific zone. Yet, it may be different for different target system and may only require four zones simply because the binary systems. It means not necessary all target separation system requires five zones set-up, it relies on the nature of target system. This schematic drawing shall serve well for purpose of illustration.

The resin quantity 112 installed in each cell of apparatus is equivalent to mass transfer zone 103, formerly defined MTZ in chromatography. It means the zone 103, representing by resin quantity 112, is the resin been saturated with the fixed feed volume 111 and is installed in each cell of apparatus. From the elution profile of single cell evaluated under criterion of said new mass transfer described in FIG. 6a, such result can be implemented with said apparatus for differential set-up. Note the same amount of solid phase 112 determined in feed zone is installed for other cells in different tones.

The zones shown in FIG. 6b comprise loading zone 14, first impurity stripping zone 15, product recovery zone 16, regeneration zone 17, and washing zone 18. The time spent for each corresponding zone, obtained from FIG. 6a, is divided by same minimal time interval Δt in feed zone to gain the number of optimal steps for such zone. The predetermined minimal interval Δt is interpreted, as primarily for the time required for such partial volume of liquids to simultaneously sip through each cell via vacuum and/or pressure air. The number of optimal steps is equivalent to number of cells or groups of cells as one advance step installed in each corresponding zone. The type can be input S-I for isocratic elution or input I-I for discrete isocratic elution in accordance with earlier illustration. The input S-I only differentiates the volume of same mobile phase condition, meaning the partial volume delivered within every spent of minimal time interval for each cell is obtained from total liquid volume divided by number of optimal steps. The input I-I differentiates both the input volume and mobile phase condition in accordance with each minimal time interval spent. Each partial input volume is a discrete increment of mobile phase condition fallen in between two adjacent conditions with each corresponding number of step. In reality of liquid delivering module of input I-I fox said apparatus, such preset intermediate mobile phase's condition is separately delivered in such partial volume for the corresponding cell that stops underneath to receive such liquid dose.

The time spent for feed loading, under criterion of maximum adsorption efficiency, divided by minimal time interval to obtain the number of steps is the number of cells or group of cells as an advanced step in loading zone 14. After volume 111 divided with number of optimal steps, the pairs of partial feed volume 113 and amount of solid phase 112 is grouped to constitute as a cell. The integration of all cells with time allows one cell to accomplish loading within every spent of minimal time interval. As all cells simultaneously receive the volume 113 and always has one cell or a group of cells as an advanced step moves out from zone 14 to zone 15.

In first impurity stripping zone 15, the liquid volume 114 represents the total volume for input S-I of condition #2 or the cumulative volume for input I-I of liquids between #1 and #2. After volume 114 divided with number of optimal steps, the pair of partial volume 115 and resin 112 is grouped to constitute as a cell. The integration of all cells in zone 15 accomplishes the elution of first impurity group within every time interval Δt spent. As all cells simultaneously receive the volume 115 and always has one cell or a group of cells as an advanced step moves out from zone 15 to zone 16.

In product recovery zone 16, the liquid volume 117 represents the total volume of mobile phase #3 for input S-I or cumulative volume for input I-I of liquids between #2 and #3. After volume 117 divided by the number of optimal steps, the pair of partial volume 118 and resin 112 is grouped to constitute as a cell. The integration of all cells in zone 16 accomplishes the elution of product A within every time interval Δt spent. As all cells simultaneously receive the volume 118 and always has one cell or a group of cells as an advanced step moves out from zone 16 to zone 17.

In regeneration zone 17, the liquid volume 119 represents the total volume of mobile phase #4 for input S-I. After volume 119 divided by the number of optimal steps, the pair of partial volume 120 and resin 112 is grouped to constitute as a cell. The integration of all cells in zone 17 accomplishes the elution of $2^{nd}$ impurity group within every time interval Δt spent. As all cells simultaneously receive the volume 120 and always has one cell or a group of cells as an advanced step moves out from zone 17 to zone 18.

In washing zone 18, the type of input is input S-I and liquid volume 121 of mobile phase #1 can be recycled from fluid collected in zone 14. After volume 121 divided by the number of optimal steps, the pair of partial volume 122 and resin 112 is grouped to constitute as a cell. The integration of all cells in zone 18 accomplishes the adjusting resin ready for loading within every time interval Δt. Because the all cells simultaneously receive the volume 122 and always has one cell or a group of cells as an advanced step moves out from zone 18 to zone 14.

Figure 7:
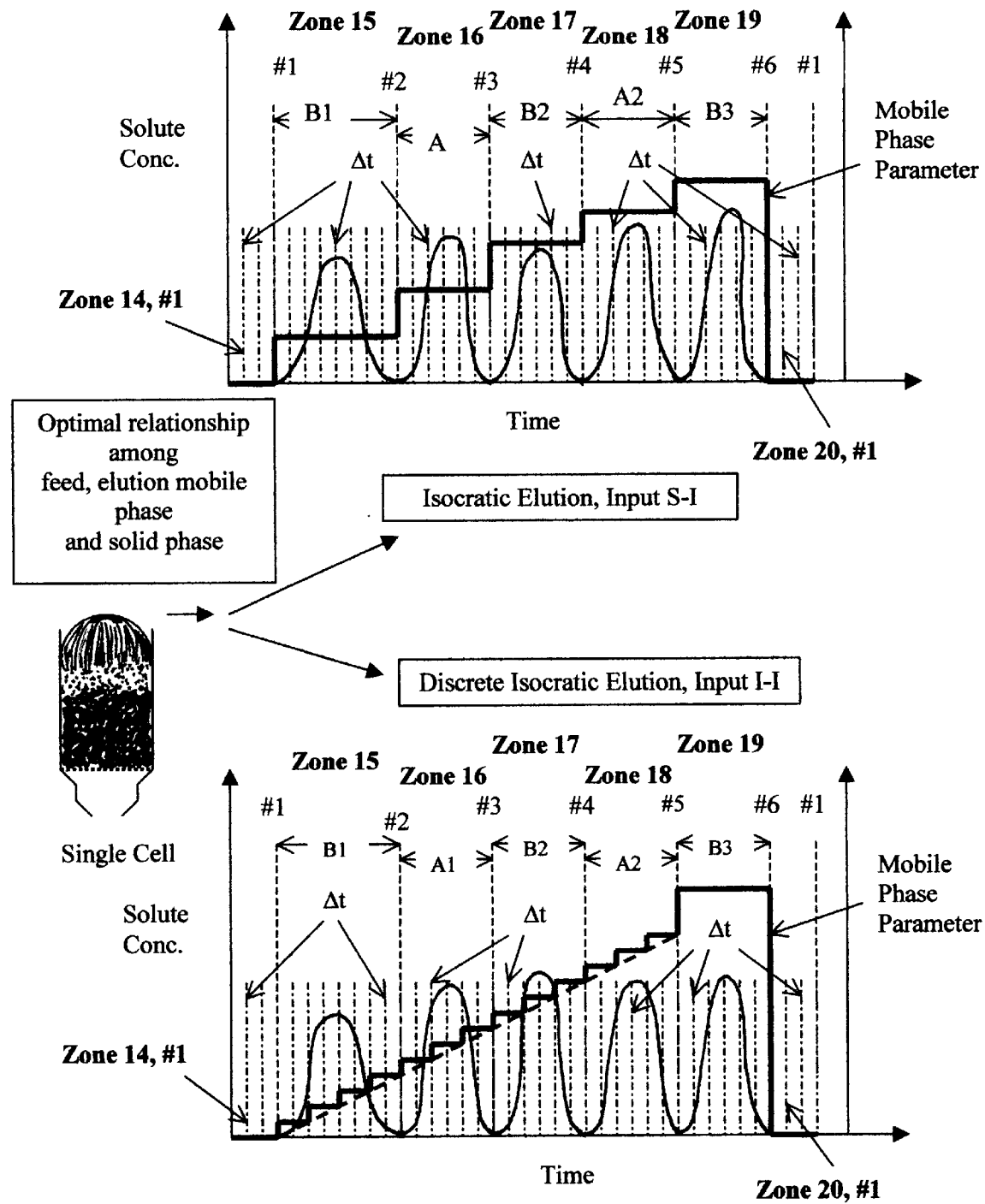
FIG. 7 is the method to implement for continuous and simultaneous isolation of multiple products in conjunction with a generalized scheme to carry out the differential set up.

The differential set-up is further extended to simultaneous isolation of plural streams of different product with concurrent and continuous execution of feeding, multiple groups of impurity stripping, regeneration, and washing. Depending upon nature of the target system, it requires producing an elution characteristic profile from a single cell by applying new mass transfer method described previously. A wide variance can be existed and end up with different separation protocol, however, the result of such profile is sufficient to designate various zones for the apparatus. For easier illustration, FIG. 7 is a schematic diagram to elucidate such extension for simultaneous two products recovery through seven zones set-up. It depends upon how the product and impurities are defined to end up less than seven zones to recover more than two products. It is therefore to specify that a desired product is isolated in between two impurities groups, considering that has three impurities groups and two products plus feeding and washing ends up total seven zones. The solute concentration is plotted on left-Y-axis as a function of cumulative time. Moreover, the mobile phase parameter is plotted on right-Y-axis as a function of cumulative time.

The illustrative elution profile for isocratic elution, input S-I mode, by starting from mobile phase #1 (feed condition) through #2, #3, #4, #5 to final mobile phase #6 generates five peaks. After completing the loading by the same earlier illustration of differential set-up between two phases in loading zone 14 to obtain the maximum adsorption efficiency. All subsequent elution liquid's conditions are predetermined with earlier teaching of iso-point belief. The #2 condition has been preset prior to the iso-point of desired product Al such that all impurities are grouped, as B1 will be eluted before product A1. This covers first impurity-stripping step proceeds in first impurity-stripping zone 15. The #3 mobile phase has its condition just elutes the desired product A1 prior to iso-point of impurities group B2. This covers the first product-recovery step proceeding in first product-recovery zone 16. The #4 condition is input to cover elution of impurities B2 as second impurity-stripping step proceeding in second impurity-stripping zone 17. The #5 condition is input to cover elution of desired product A2 prior to iso-point of impurity group B3. This covers the second product recovery carrying out in second product-recovery zone 18. The #6 condition is input to cover elution of $3^{rd}$-impurity step proceeding in $3^{rd}$-impurity-stripping zone 19. Finally, the washing step is proceeded in washing zone 20 by recycling of #1 mobile phase collected from feed zone to prepare resin ready for loading again.

The input I-I is illustrated by starting from loading step to obtain the maximum adsorption efficiency proceeded in feeding zone 14 with #1 mobile phase. The first impurity-stripping step is followed and proceeded in first impurity stripping zone 15 by minor increment of mobile phase parameter starting from #1 then ending by #2 to maximize elution of B1 and avoid the co-elution with product A1. The first product recovery step is proceeded in first product recovery zone 16 by input I-I starting #2 then ending #3 to maximize the elution of product A1 and avoid co-elution of second impurity group B2. The second impurity-stripping step is proceeded in second impurity stripping zone 17 by input I-I starting from #3 then ending by #4 for maximizing the elution of second impurity group B2 and avoid co-elution of second product A2. The second product recovery step is proceeded in second product recovery zone 18 by input I-I starting #4 then ending #5 for maximizing the elution of product A2 and avoid co-elution of third impurity group B3. Once the product A2 is eluted, the regeneration step is proceeded in regeneration zone 19 by input S-I #6 mobile phase to strip third impurity group B3. Generally, one increment of mobile phase parameter is sufficient for each increment of minor interval Δt, and yet requires experimental validation from the target system. Finally, the washing step is proceeded in washing zone 20 by input S-I with #1 mobile phase recycled from zone 14 to prepare resin ready for zone 14 adsorption.

Figure 8:
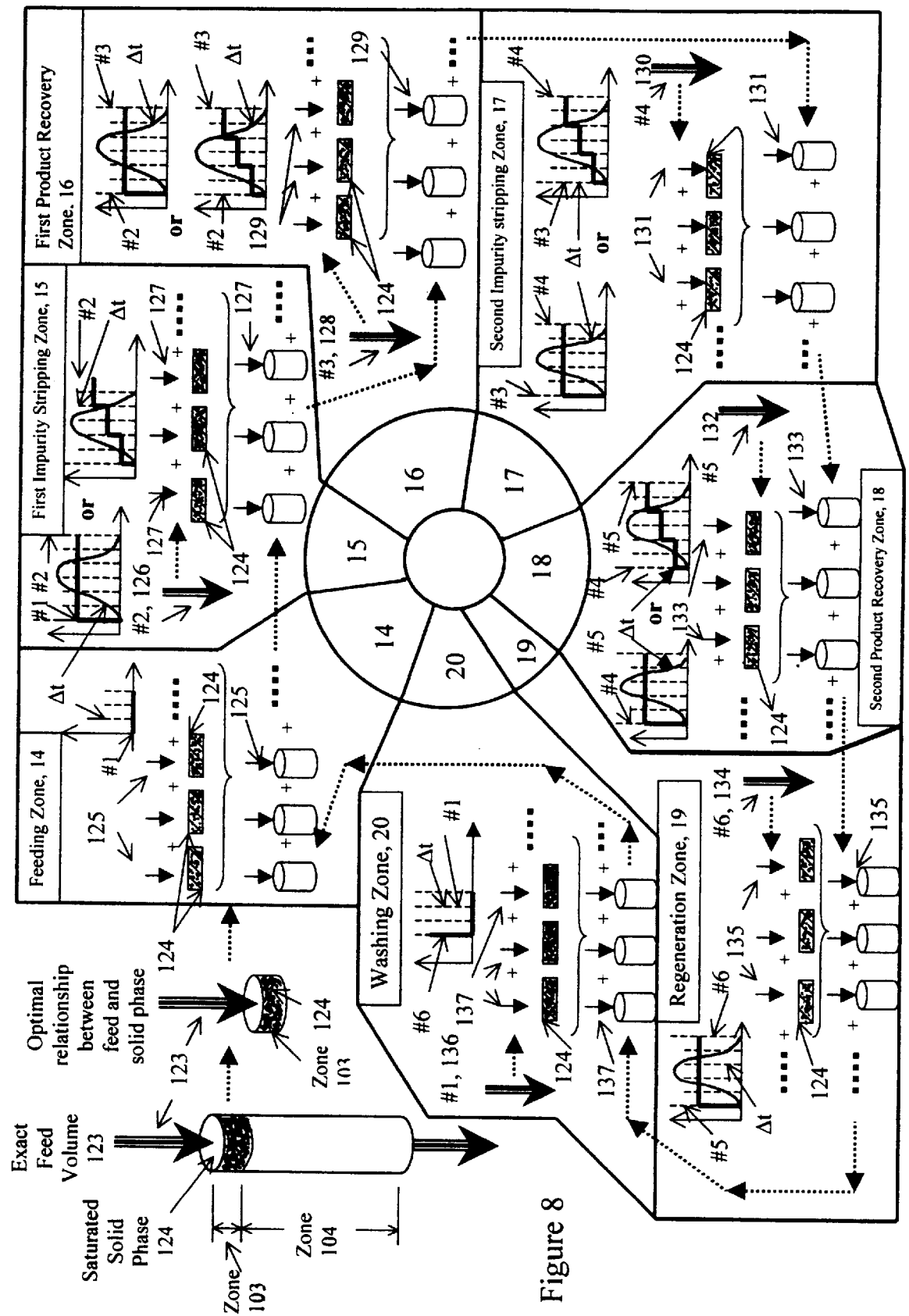
FIG. 8 is an illustrated example, the generalized scheme demonstrated for the isolation of two products A1 and A2 and impurities groups of B1, B2, and B3.

The annular ring shown in FIG. 8 symbolize the simplified apparatus to implement the differential set-up between two phases from characteristic elution profile described in FIG. 7. It comprises feeding zone 14, first impurity stripping zone 15, first product recovery zone 16, second impurity stripping zone 17, second product recovery zone 18, regeneration zone 19, and washing zone 20, respectively. The time spent for each corresponding zone, obtained from last figure is divided by same minimal time interval Δt in feed zone to gain the number of optimal steps for such zone. The number of optimal steps is equivalent to number of cells or groups of cells as one advance step installed in each corresponding zone. The resin quantity 124 installed in each cell of apparatus is equivalent to mass transfer zone 103 in chromatography. Such zone represented by resin 124 is saturated with fixed feed volume 123 proceeded in accordance with new mass transfer method.

The time spent for feed loading, under criterion of maximum adsorption efficiency, divided by minimal time interval to obtain the number of steps is the number of cells or group of cells as an advanced step in loading zone 14. After volume 123 divided with number of optimal steps, the pairs of partial feed volume 125 and amount of solid phase 124 is grouped to constitute as a cell. The input type for zone 14 is input S-I. The integration of all cells with time allows one cell to accomplish loading within every spent of minimal time interval. As all cells simultaneously receive the volume 125 and always has one cell or a group of cells as an advanced step moves out from zone 14 to zone 15.

In first impurity stripping zone 15, the liquid volume 126 represents the total volume for input S-I of condition #2 or the cumulative volume for input I-I of liquids between #1 and #2. After volume 126 divided with number of optimal steps, the pair of partial volume 127 and resin 124 is grouped to constitute as a cell. The integration of all cells in zone 15 accomplishes the elution of first impurity group within every time interval Δt spent. As all cells simultaneously receive the volume 127 and always has one cell or a group of cells as an advanced step moves out from zone 15 to zone 16.

In first product recovery zone 16, the liquid volume 128 represents the total volume for input S-I of condition #3 or the cumulative volume for input I-I of liquids between #2 and #3. After volume 128 divided with number of optimal steps, the pair of partial volume 129 and resin 124 is grouped to constitute as a cell. The integration of all cells in zone 16 accomplishes the elution of product A1 within time interval Δt spent. As the all cells simultaneously receive the volume 129 and always has one cell or a group of cells as an advanced step moves out from zone 16 to zone 17.

In second impurity stripping zone 17, the liquid volume 130 represents the total volume for input S-I of condition #4 or the cumulative volume for input I-I of liquids between #3 and #4. After volume 130 divided with number of optimal steps, the pair of partial volume 131 and resin 124 is grouped to constitute as a cell. The integration of all cells in zone 17 accomplishes the elution of second impurity group B2 within time interval Δt spent. As the all cells simultaneously receive the volume 131 and always has one cell or a group of cells as an advanced step moves out from zone 17 to zone 18.

In second product recovery zone 18, the liquid volume 132 represents the total volume for input S-I of condition #5 or the cumulative volume for input I-I of liquids between #4 and #5. After volume 132 divided with number of optimal steps, the pair of partial volume 133 and resin 124 is grouped to constitute as a cell. The integration of all cells in zone 18 accomplishes the elution of second product A2 within time interval Δt spent. As all cells simultaneously receive the volume 133 and always has one cell or a group of cells as an advanced step moves out from zone 18 to zone 19.

In regeneration zone 19, the liquid volume 134 represents the total volume of mobile phase #6 for input S-I. After volume 134 divided by the number of optimal steps, the pair of partial volume 135 and resin 124 is grouped to constitute as a cell. The integration of all cells in zone 19 accomplishes the elution of third impurity group within every time interval Δt spent. As all cells simultaneously receive the volume 135 and always has one cell or a group of cells as an advanced step moves out from zone 19 to zone 20.

In washing zone 20, the type of input is input S-I and liquid volume 136 of mobile phase #1 can be recycled from fluid collected in zone 14. After volume 136 divided by the number of optimal steps, the pair of partial volume 137 and resin 124 is grouped to constitute as a cell. The integration of all cells in zone 20 accomplishes the adjusting resin ready for loading within every time interval Δt. Because the all cells simultaneously receive the volume 137 and always has one cell or a group of cells as an advanced step moves out from zone 20 to zone 14.

In cases of either single or multiple products recovery, each partial liquid volume simultaneously inputs for each cell in various zones specifically proceeding one task. The resin installed in each cell is corresponding to the mass transfer zone 103 in chromatography. The minimal interval Δt defined in this invention is the time required for specific liquid to travel through the cell compared with that for mass transfer zone in chromatography. The chromatography operation needs to push such mass transfer zone slowly from one end to emerge from other end of column to obtain separation. Moreover, the resin loaded in each cell located in various zones is always active and independent from each other. From the viewpoint of entire separation cycle, it evidently shows that the integration of all cells in various zones simultaneously covers stages from loading throughout regeneration and washing for every minimal interval Δt spent. With employment of disclosed methods onto said apparatus, based on same throughput between chromatography and this invention, it has successfully demonstrated for reduction of cycle time from hours to minutes. It means that the resin inventory can be proportionally reduced as dramatic cycle time reduction. It then advantageously reduces the cost of production due resin reduction that gives rise to smaller equipment to generate numerous economic benefits.

The differential set-up between two phases proceeded through new mass-transfer method enables the process to obtain a swift and precise mass-transfer contact between predetermined mobile phase and resin. This specific mass transfer is achieved in each independent cell and the integration and coordination of all cells becomes a complete separation process. It means the native engineering drawbacks of conventional column process, such as high-pressure operation and axial dispersion and end effects will not deteriorate the efficiency of new separation process. It then concludes that the disclosed process can provide the maximum operation efficiency. This operation efficiency is only limited by the mechanical capability of preferred apparatus to obtain the expected separation results. It provides evidence that the process operation efficiency can be preserved and controlled by process itself inasmuch as the predetermined mobile phase parameters are suitable. It means the impurity-stripping zone will maximize its stripping efficiency to assure high throughput of impurities. It means for product recovery zone, located after the impurity-stripping zone along the process rotation direction, will maximize the production rate, product yield and economic efficiency. It means for regeneration and washing zone, located after the product recovery zone and before the feeding zone along the process rotation direction, will minimize the process time and maximize the production rate.

In general, the scale up of existing process from bench top to production scale is to quantify the increment of capacity requirements. The production scale simply magnifies with size increments to a larger process size. This invention has revolutionized and evidently changed the rule that simply by increasing the number of bench-top scale to meet such capacity requirements. As all cells in said apparatus representing as one small scale that are independent from each other and simultaneously, perform one task at any instance such that the integration and coordination of all cells become a complete process. Particularly, unit chemical operation composes of sequential stages that are linked together to carry out such operation. The traditional scale-up strategy focuses mainly on size increment and often ignores the coordination that part of stages may be idled during the-proceeding of entire operation. Particularly in column operation been long recognized for inefficient usage of packing materials, this invention has clearly ratified the strategy of scale up by implementation of differential method between two phases and new mass transfer method. The preferred apparatus has demonstrated the mechanical capability to implement and transform the path of the mass transfer from sequentially vertical direction to simultaneously horizontal direction. Both methods and means to implement such methods are tied together as hybrid embodiments. These hybrid embodiments can be extended to other resembling chemical unit operation such as catalytic reactions in packed bed and ordinary fluidized reaction involved in solid and liquid phases. The capabilities of cycle time reduction via differential method and preferred apparatus can benefit reduction of process size proportionally and ends up with production cost reduction.

The principle objects of the present invention is to provide a corresponding operation protocol for preferred apparatus to implement the proposed methods; to continuously and automatically isolate a single product or multiply products from a target mixtures. Only single product case by input S-I mode will be illustrated for sake of simplified discussion. For the input I-I mode needs to further break down the liquid delivery module for each cell for different liquid input. As shown in FIG. 1, all vacuum pumps are necessary to be employed the whole time to continuously drain the liquid from all cells and to maintain resin in semi-dry status for the criterion of said new mass transfer method. Liquid input is conducted as described in FIG. 3 as said new mass transfer method to promote designated mass transfer. Moreover, it shall understand these two cells as a group, as an advanced step is arbitrary for demonstration only. The protocol comprises of three stages of operation method, including startup stage, steady state stage, and termination stage.

The startup stage beginning from first group of two cells 11 located at beginning position in zone 14, the predetermined amount of feed solution is delivered via a solenoid valve 54 located above these cells. The duration of valve opening is preset to control the volume of feed delivery. Soon after the feed delivery is completed, all solenoid valves 55 are engaged to purge the pressure air or inert gas to affiliate the vacuum to settle the bed, to percolate the #1 liquid into compartment 20. All valves 55 are de-energized to shut off pressure air. This brings the fluid delivery to end. The center-mounted motor 89 is energized to rotate and terminated one step forward by said rotation and positioning mechanism. Simultaneously during the rotation, the liquid solenoid valve 44 (not shown) is opened to guide the collected liquid in compartment 20 into underneath holding tank. The whole sequences of movement accomplish within one minimal time interval, $\Delta t$. This brings the first cells into second position, following cells from last position of zone 18 into beginning position of zone 14. Then, the first and second solenoid valves 54 are simultaneously opened to deliver prefixed volume of feed solution into each underneath cell. Soon after both liquid valves 54 are shut off, all air valves 55 are opened to purge air to settle the bed and drain the liquid into compartment 20. Then, all air valves 55 are shut off. The motor 89 is energized again to rotate and meantime to engage liquid valve to guide liquid into underneath holding tank 25; and then terminate one advance step forward. This whole sequence of movement is completed by same minimal time interval, $\Delta t$. Note only two steps are required in zone 14; means the resin retained in second step has already saturated with feed solution. The third rotation will move these cells original at beginning position out of zone 14 into first position of zone 15. This brings meanwhile the cells in beginning position into second position of zone 14 and following cells into first position of zone 14. The first valve 54 in zone 15 and two valves 54 in zone 14 are simultaneously opened. The cells in first position of zone 15 receives #2 mobile phase that can elute first impurity group, meanwhile loading is proceeding for both steps in zone 14. After the prefixed mobile phases finished delivery, all air valves 54 are opened to release air to settle the beds and drain the liquids into compartment 20 in zone 14 and compartment 21 in zone 15 to end. The motor 89 is engaged again to rotate and simultaneously drain the liquid into respective holding tank. Again, these procedures spent by same minimal time interval. Note those two steps in loading zone and total twenty-two steps covering all zones are arbitrary picked for easy illustration, and it does not reflect to any specific separation system.

The cycles of concurrent liquids input up to where the first cell located, pressure air or gas releasing, bed settling with liquid draining, pressure air or gas shutting off, rotating one step forward and simultaneously guiding liquid through liquid solenoid valve into holding tank are repeated repeatedly. Since the time spent for the repeated cycle is same for each step and is tied in with the characteristic profile of target separation system; in which are related with said illustration in FIG. 5 through FIG. 8. Thus, the first cells takes total twenty-two steps, by starting from the beginning position in zone 14 throughout the last position in zone 18 to complete their journey as a complete separation cycle. These particular cells return to their beginning position on the twenty-thirds step. The whole separation cycle of particular system is proceeded under the criterion of new mass transfer method via differential set-up between two phases onto the preferred apparatus.

After the first cell initially at beginning position of zone 14 completes the last position in zone 18 and return to its initial position. This is the beginning of steady-state stage. It means all cells in various zones will simultaneously receive the various fluids to proceed operation of loading, impurity stripping, product recovery, regeneration, and washing. The repeated cycles of liquid input to partially fluidize the bed, releasing of pressure air to settle the bed and drain the fluid, pressure air shut off, and advance one rotation step are simultaneously proceeded for all cells in all zones. All cells are independent from each other and combination of all functions of all cells becomes a complete separation cycle. It means that every spent of minimal time interval at steady state stage, Δt, is for accomplishing a complete separation cycle concurrently covering from loading throughout washing. The predetermined characteristic elution is the outcome of new mass transfer contact method and differential set-up between two phases, which are implemented by the steady-state operation of the preferred apparatus during every spent of minimal time interval, Δt.

The termination stage provides the proper procedures to terminate the proceeding of steady-state stage. It allows the resin retained in each cell for all zones returns to fresh status. As shown again in FIG. 1, once the termination stage is engaged. The repeated cycle of liquid input is stopped from the beginning position of loading zone 14 by not engaging the liquid valve 54 located above these cells. Other positions in the apparatus still simultaneously proceed the same repeated cycles by every minor time interval. As the cells located at first position of zone 14 comes from the last position of zone 18, which retain the resin at fresh status. After the first spent of Δt, the cells initially at the first position do not receive the feed move to second positions in zone 14. The following cells from zone 18 takes beginning position in zone 14, which are fresh resin as well. After the second spent of Δt, both first and second position in zone 14 maintains fresh resin and other cells repeat same repeated cycles of liquid filling and so on. The repeated stop liquid input is stepwise to include the next position of cells until the cells initially located at beginning position of zone 14 move into the last position of zone 18. Particularly shown in FIG. 1, this termination stage takes same twenty-two steps as that in startup stage to complete. This will conclude the termination stage; meaning the resin retained in all cells is in fresh status. Finally, all vacuum pumps installed in various zones can be terminated as well.

Both of FIG. 9 and of FIG. 10 exhibit the simplified disclosed apparatus by an annular ring divided in part for representing various zones. The FIG. 9 shows the single stage recycles for single product recovery, as to previous illustration in FIGS. 6 and 7. The schematic procedures emphasize the fluid flow after solid and liquid contact for demonstrating the concurrent separation, efficient usage of mobile phases, and concentration enhancement of separated fractions. Although in reality, it may require simultaneously recovery of multiple products. However, this shall serve the purpose of illustration for general recycle protocol. The various streams of fluid being drained and collected to each corresponding holding tank, which can be recycled back to same zone or different zones as required from the target system. The number of cycles of fluid being recycled for each zone is varying and may require experimental evaluation prior the employment of recycle protocol.

Soon after the startup stage is finished, all zones are proceeded simultaneously for steady state operation. The feed input via line 138 and other fluids are simultaneously delivered to all cells in all zones. It means the collected fluid from the zone 14 and is temporally stored in tank 25 via line 139. The fluid is delivered from tank 25 via line 140 into zone 18 for economic usage of mobile phase to adjust the resin to fresh status ready for feed zone 14. It means the collected fluid from zone 18 via line 141 stored in tank 29 can be discarded or delivered for further treatment via line 142. This fluid flow circuit is constantly maintained for startup stage, steady state stage, and termination stage.

The recycle circle is concurrently maintained in zone of 15, 16, and 17 during the steady state operation. It means that the predetermined fresh fluid #2 is delivered into first impurity stripping zone 15 via line 300, while line 144 is shut off. The collected fluid from this zone via line 143 and is temporally stored in holding tank 26. It means that the predetermined fresh fluid #3 is delivered into the product recovery zone 16 via line 301 while line 146 is shut off. The collected fluid from this zone via line 145 and is temporally stored in tank 27. It means that the predetermined fresh fluid #4 is delivered into regeneration zone 17 via line 302, while line 148 is shut off. The collected fluid from this zone via line 147 and is temporally stored in tank 28.

Once the fluid collected in each holding tank is sufficient for simultaneously recycling. The fluid is recycled from tank 26 via line 144, while line 300 is shut off, and delivered back to the same zone for the economic saving to intensify the impurity concentration level within the same zone. The fluid is recycled from tank 27 via line 146, while line 301 is shut off, and delivered back to the same zone for economic saving and enhancing the product concentration level within the same zone. The fluid is recycled from tank 28 via line 148 while line 302 is shut off, and delivered back to the same zone for economic savings and intensifying the concentration level of second-impurity group within the same zone. Note that while the recycle protocols are proceeding concurrently in zones 15, 16, and 17, the loading and washing are proceeding simultaneously as well in zones 14 and 18.

After spending the predetermined number of cycles, the fluid can be simultaneously discarded until loses its activity to perform its function or to be recovered as concentrated product for designated concentration level. It means the fluid been recycled in zone 15 can be delivered from tank 26 via 149, while line 144 is shut off, to be discarded or delivered further treatment. It means the fluid been recycled in zone 16 can be delivered from tank 27 via 150, while line 146 is shut off, to be recovered as concentrated product. It means the fluid been recycled in zone 17 can be delivered from tank 28 via 151, while line 148 is shut off, to be discarded or delivered further treatment. Then, fresh fluids for zones 15, 16, and, 17 can be simultaneously reintroduced to make up fluids been removed. The fresh #2 fluid can be delivered via line 300, while line 144 is shut off, to proceed the separation and to make up the removal. The fresh #3 can be delivered via line 301, while line 146 is shut off, to proceed separation and to make up the removal. The fresh #4 can be delivered via line 302, while line 148 is shut off, to proceed separation and to make up the removal. Once, the make up of fluid for each zone is accomplished, the recycle can be resumed until another set of recycles are spent. By doing so, the efficient usage of various mobile phases in different zone can be maximized.

The termination protocol for single stage recycle to allow the process to return to its initial status from the steady state operation, which is same as the earlier illustration of termination stage. Preferably, the last cycle of separation is set with recycle mode due all cells will pass through washing zone 18 that resin packed in each cell can be washed prior the completion of termination stage.

FIG. 10 explicates the multiple stages recycle by serving five units connected in series with single product recovery in accordance with FIG. 6 to simplify the demonstration. For a particular target system, the number of stages is the number of apparatus connected in series and is equal to the predetermined number of cycles said in the single stage illustration. In general, the feed throughput is evenly divided by the number of stages in a series. Such partial amount of feed throughput and the zone establishment for each corresponding stage is transmitted through each characteristic elution profile derived from the said new mass transfer method and differential set-up between two phases. Moreover, the path of distribution the fluid from current stage to next stage can be varied with different target system. It may be distributed as input for the designated zone in next stage, or as partial distribution within the same stage and partial distribution as input for the designated zone in next stage. It may be reserved as product or by-product for particular stage and partially distribute for next stage and fresh liquid needs to make up in the next stage for fluid has been reserved as product or by-product in previous stage. The purpose of recycle is for utilizing mobile phase in a most efficient manner to simultaneously obtain separation and concentration enhancement of separated fractions. Thus, the operation protocol for multiple recycle stages, including start-up step, steady-state step, and termination step, is exemplified via liquid flow path indicated in FIG. 10.

The start-up step for multiple recycle stages is the sequential application of aforementioned startup stage for individual unit connected in series. While the remaining four units are idled, the first unit starts feed input via line 152 shown as Stage 1 in FIG. 10 through procedures of startup stage. Such that the first cell initial at beginning position completed the journey to return to its initial beginning position in zone 14. At this moment of completing of startup stage, the feed input need to be started in unit #2 via line 153 simultaneously with the steady-state proceeding of unit #1.

During the startup stage of unit #1, the holding tank 25 has already delivered the fluid collected from zone 14 via line 154 into zone 18 via line 155. The collected fluid via line 156 temporally stored in tank 29 may be discarded or delivered for further treatment via line 157. The fresh #2 mobile phase is initially delivered via line 303 into zone 15 and the holding tank 26 has collected sufficient fluid via line 158 and recycled as an input via line 159 into zone 15 of unit #2. The fresh #3 mobile phase is initially delivered via line 304 into zone-16 and the holding tank 27 has collected sufficient fluid via line 160 and recycled as an input via line 161 into zone 16 of unit #2. The fresh #4 mobile phase is initially delivered via line 305 into zone 17 and the holding tank 28 has collected sufficient fluid via line 62 and recycled as an input via line 163 into zone 17 of unit #2. The collected fluid via line 164 from zone 14 of unit #2 into tank 25 is delivered via line 165 to zone 18 to adjust the resin for adsorption. The collected fluid via line 166 into tank 29 of unit #2 may be discarded or delivered for further treatment via line 167. The timing and sequence of recycled fluids delivered from unit #1 into various zones in unit #2 are preset through aforementioned startup stage protocol.

Soon after the startup stage for unit #2 is completed, the third unit in series then engages its startup stage by feed input via line 168 while unit #4 and #5 remains idle. It means the fresh fluid concurrently delivered via lines 303, 304, and 305 into zones 15, 16, and 17, then, collected and simultaneously delivered via lines 159, 161, and 163 into corresponding zones 15, 16, and 17 of unit #2. Meanwhile, the fluid collected from zone 15, 16, and 17 in unit #2 is sequentially delivered at appropriate timing through aforementioned startup protocol to support the fluid required for startup stage of unit #3. It means the fluid collected via line 169 from zone 15 of unit #2 is temporally stored in tank 26 and recycled as input via line 170 to zone 15 of unit #3. It means the fluid collected via line 171 from zone 16 in unit #2 is temporally stored in tank 27 and recycled as input via line 172 to zone 16 of unit #3. It means the fluid collected via line 173 from zone 17 in unit #2 is temporally stored in tank 28 and recycled as input via line 174 to zone 17 of unit #3. The fluid collected via line 175 from loading zone 14 and temporally stored in tank 25 is delivered via line 176 into zone 18 for resin adjustment. The collected fluid via line 177 into tank 29 may be delivered via line 178 for further treatment. Again, all cells in unit #3 stepwise rotate through aforementioned startup protocol to receive various fluids to allow the first cell initial in beginning position of zone 14 to return its initial position.

Soon after the startup stage for unit #3 is completed, the fourth unit in series engages the startup stage by feed input via line 179. While the first through third unit simultaneously proceeds the steady-state operation and fifth unit remains idle. Likewise, the fluid collected from first and then through second unit are simultaneously delivered from holding tanks via lines 170, 172, and 174 into corresponding zones 15, 16, and 17 of unit #3. Meanwhile, the fluid collected from zone 15, 16, and 17 in unit #3 is sequentially delivered at appropriate timing through aforementioned startup protocol to support the fluid required for startup stage of fourth unit. It means the fluid collected via line 179 from zone 15 in unit #3 is temporally stored in tank 26 and recycled via line 180 as input into zone 15 of unit #4. It means the fluid collected via line 181 from zone 16 in unit #3 is temporally stored in tank 27 and recycled via line 182 as input into zone 16 of unit #4. It means the fluid collected via line 183 from zone 17 in unit #3 is temporally stored in tank 28 and recycled via line 184 as input into zone 17 of unit #4. The fluid collected via line 185 from loading zone 14 in unit #4 and temporally stored in tank 25 is delivered via line 186 into zone 18 for resin adjustment. The collected fluid via line 187 into tank 29 may be delivered via line 188 for further treatment. Again, all cells in unit #4 stepwise rotate through aforementioned startup protocol to receive various fluids to allow the first cell initial at beginning position of zone 14 to return its initial position.

Soon after the startup stage for unit #4 is completed, the fifth unit in series will engage the start-up stage by feed input via line 189 while the first through fourth unit simultaneously proceeds the steady-state operation. Likewise, the fluid collected from the first through third unit in series are simultaneously delivered via lines 180, 182, and 184 into corresponding zones 15, 16, and 17 of unit #4. Meanwhile, the fluid collected from zone 15, 16, and 17 in unit #4 is sequentially delivered at appropriate timing through aforementioned startup protocol to support the fluid required for startup stage. It means the fluid collected via line 190 from zone 15 in unit #4 is temporally stored in tank 26 and recycled via line 191 as input into zone 15 of unit #5. It means the fluid collected via line 192 from zone 16 in unit #4 is temporally stored in tank 27 and recycled via line 193 as input into zone 16 of unit #5. It means the fluid collected via line 194 from zone 17 in unit #4 is temporally stored in tank 28 and recycled via line 195 from holding tanks into zone 17 of unit #5. The fluid collected via line 196 from loading zone 14 in unit #5 and temp rally stored in tank 25 is delivered via line 197 into zone 18 for resin adjustment. The collected fluid via line 198 into tank 29 may be delivered via line 199 for further treatment. Again, all cells in unit #5 rotate forward through aforementioned startup protocol to receive various fluids to allow the first cell at beginning position of zone 14 to return its initial position. This concludes the startup stage for unit #5 and brings to an end for the start-up step.

The process is ready for steady-state step; meaning each unit, exemplified in series of five, is in steady state operation. The zone 14 of unit #1 through #5 simultaneously undergo partial feed input via lines of 152, 153, 168, 179, and 189. Simultaneously collecting fluid from zone 14 via lines of 154, 164, 175, 185, and 196 and temporally store in each holding tank 25; and concurrently deliver via lines of 155, 165, 176, 186, and 197 into zone 18. The fluids are further collected via lines of 156, 166, 177, 187, and 198 from each zone 18 into corresponding tank 29 and simultaneously delivered via lines of 157, 167, 178, 188, and 199 for further treatment or discarded. The fluid flow from each zone 14 toward zone 18 located in same stage is for resin adjustment prior forwarding into loading zone.

Under the steady state operation, the zone 15 of first unit receives fresh #2 mobile phase via line 303. Simultaneously, the used #2 mobile phase is flowed from each intermediate holding tank 26 of first unit through fourth unit via lines of 159, 170, 180, and 191 into respective zone 15 of the following unit. Simultaneously, each intermediate holding tank 26 receives the collected fluid from the corresponding zone 15 via lines of 158, 169 179, 190, and 200. Moreover, the used mobile phase, enriched in first impurity group, is simultaneously delivered via line 201 for further treatment.

Simultaneously, the zone 16 of first unit receives the fresh #3 mobile phase via line 304. Simultaneously, the used #3 mobile phase is flowed from each intermediate holding tank 27 of first unit through fourth unit via lines of 161, 172, 182, and 193 into respective zone 16 of the following unit. Simultaneously, each intermediate holding tank 27 receives the collected fluid from the corresponding zone 16 via lines of 160, 171, 181, 192, and 202. Moreover, the used mobile phase, enriched in desired product, is simultaneously delivered via line 203 for further treatment.

Simultaneously, the zone 17 of first unit receives the fresh #4 mobile phase via line 305. Simultaneously, the used #4 mobile phase is flowed from each intermediate holding tank 28 of first unit through fourth unit via lines of 163, 174, 184, and 195 into respective zone 18 of the following unit. Simultaneously, each intermediate holding tank 28 receives the collected fluid from the corresponding zone 17 via lines of 162, 173, 183, 194, and 204. Moreover, the used mobile phase, enriched in second impurity group, is simultaneously delivered via line 205 for further treatment.

As the solid phase retained in each cell of respective stage represents as a mass transfer zone, of which rotates in horizontal direction to perpendicularly contact with mobile phases in partially fluidized basis. For the synchronized rotation of all cells in respective stage of multiple-stage recycle protocol, the process is providing a steady flow of mobile phases in perpendicular direction to intermediately interact with the solid phase moving in horizontal direction. Through implementation of new mass transfer method and differential set-up between two phases, the current invention simulates the characteristic elution profile of each stage and integrates with the preferred apparatus. It transforms the traditional sequential chromatography protocols to continuous and concurrent protocols. Thus, both concurrent separations of components from the target mixtures and enriching the concentration level of the separated components are simultaneously accomplished through continuous execution of these protocols. Moreover, the protocols for multiple-stage recycle have carried out the multiple mass transfer tasks simultaneously from loading to washing for each stage within every spent of minimal time interval, $\Delta t$. At any instance of steady state operation, this invention is permissive through fulfilling of these protocols to allow for the usage of both phases involved in mass transfer contact in an extreme flexibility and most efficient manner.

The termination step is to bring the process to return to its initial fresh status from steady-state operation. It proceeds the same order as in start-up step to sequentially employ the termination procedures by starting from first unit while remaining units still maintain the steady-state operation. The termination of particular unit in series follows the same procedures of aforementioned termination stage. Soon after the first unit becomes idle through completing the termination stage, the second unit starts engaging its termination procedures while the remaining units are still at steady-state proceeding. Then, third unit begins its status for termination after first and third unit become idle while the remaining units are still at steady-state operation. The stage of sequential termination applied toward the last unit to complete final termination stage for such unit and so is the conclusion of termination step protocols for multiple stages of recycle.

Following is an illustrative example to demonstrate the fact of iso-point as fundamentals for establishing elution protocols. Then, two distinctive elution profiles, between traditional chromatography and new mass transfer method, of high fructose-corn-syrup, abbreviated as HFCS, are shown. Finally, four sets of elution profiles of same sugar mixtures are shown to illustrate the recycle protocols. The new mass transfer method and differential set-up between two phases are employed in the recycle protocols for effective usage of mobile phase and dramatic reduction of cycle time. As with the reduction of cycle time, it reduces the resin stock based on it feed throughput compared between the disclosed process and traditional chromatography.

EXAMPLE 1

In this example, a single component protein solution, hemoglobin abbreviated as Hm, is explored on traditional chromatography to demonstrate the iso-point belief by cyclic adsorption and desorption. Hm has molecular weight of 63,000 and iso-electric point is at pH6.7. The protein will carry positive charge in solution with pH lower than 6.7 and conversely carry a negative charge in solution with pH higher than 6.7. The chromatography column has 2.6 cm in I.D. and 15 cm in length, was fully loaded with CM Sepharose; a cation exchanger. The Hm feed solution was prepared at 0.01 wt. % in 0.1M Tris-HCl buffer solution. The reciprocating flow through the column was achieved by a reversible peristaltic pump, which is connected to a timer for precise measurement of the sample volume. Multi-way valves are installed on column inlet to introduce the feed and elution buffer at different pH. Each sample stream was collected at equal time intervals for pH and protein concentration measurement.

Figure 11:
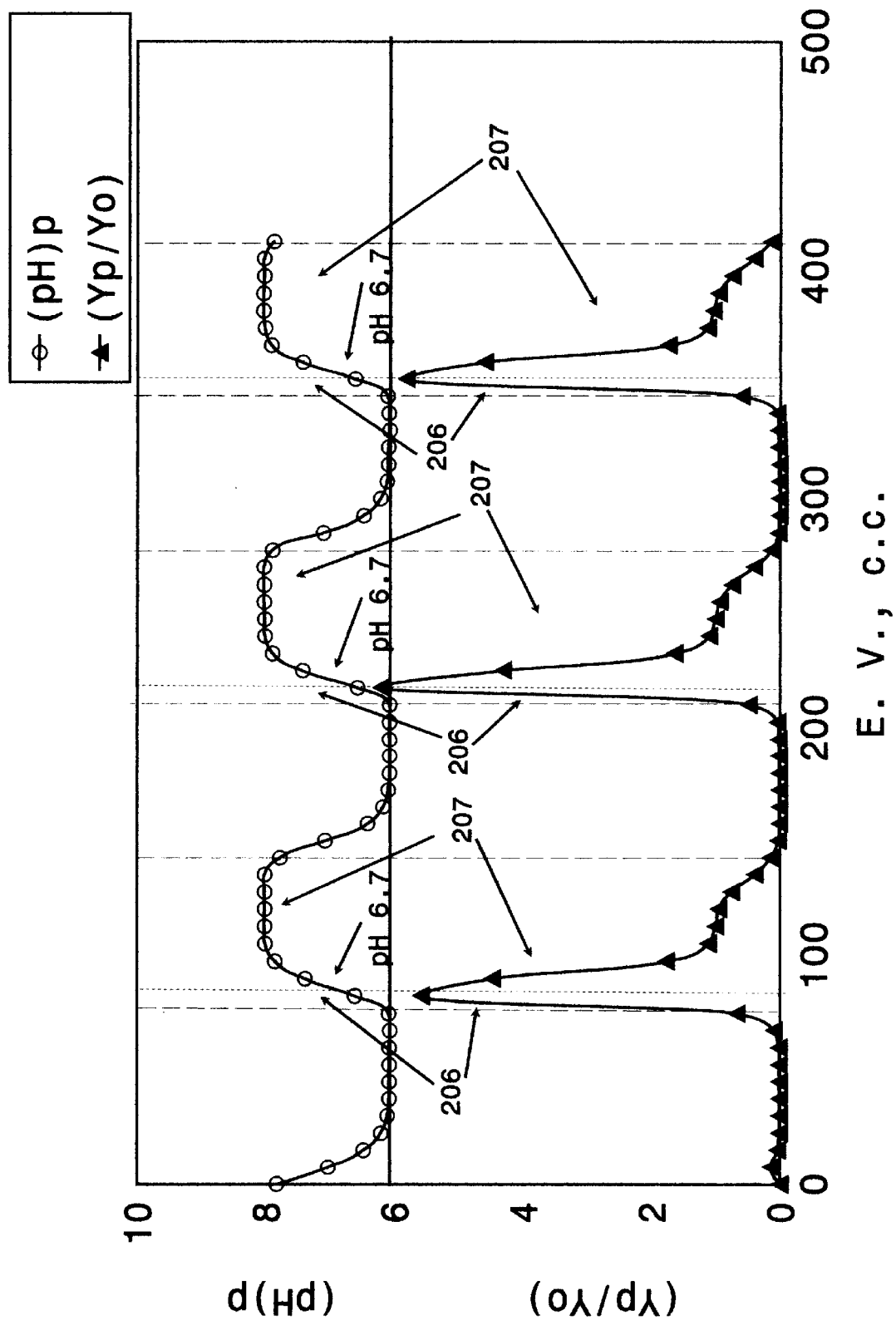
FIG. 11 shows three elution profiles of chromatographic cyclic adsorption and desorption of Hemoglobin to demonstrate the iso-point belief as guideline for employing the new mass transfer method, conversely.

In FIG. 11 shows the cyclic wave of pH curve and Hm concentration profile in dimensionless form (Yp/Yo) for each collected sample with respected to the accumulated elution volume (E.V.), cc. The feed solution was prepared at pH 6.0 and Hm carries positive charge, oppositely to cation exchanger loaded in column. The introduction of 67.5 cc of feed solution by pulse input 106 as described in FIG. 5, causes Hm been adsorbed onto the resin starting from very beginning of column. This resin is corresponding to zone 103 described in FIG. 5. The remaining resin, analogous to zone 104, is saturated with pH 6.0 buffer solution. The introduction of 67.5 cc of pH 8.0 buffer by pulse input 106 will push the existing pH6 buffer exit from other end of column. Analogous to the narrow transient region 108 illustrated in FIG. 5, the control parameter is progressively changing from pH6 to pH8, in which the Hm concentration profile is confined. Each Hm profile has a highest turning and its corresponding pH is 6.7, which is same as its iso-electric point. Note that the Hm and pH profiles are history of eluted Hm band travel starting from zone 103 throughout zone 104 and collected as samples. Initially, it is a very sharp and narrow band and become wider as this band approaching toward the column outlet, mainly caused by the diffusion and axial dispersion. However, some diffused Hm may enter areas that mobile phase pH is lower than 6.7 and cause the Hm been adsorbed again and eluted by upcoming pH higher than 6.7. This explains each Hm profile shown in this figure has flat front located in region 206 between pH 6.0 and 6.7 while long tail been expanded in region 207 located after 6.7 toward the end of pH 8.0. This phenomenon gets worse in large-scale column and has been tolerated for decades in chromatography related separation process. As earlier discussion, these native engineering drawbacks of traditional chromatography operation is time consuming, inefficient usage of resins limited loading capacity, and activate the axial dispersion and column end-effects to ruin the initial separation, etc. This phenomenon also validates the belief for the desorption of adsorbed solute components will not occurr unless the surrounding mobile phase has exceeded this component's iso-point. By controlling the separation parameter and by pass these phenomena toward new mass transfer method and differential set-up between two phases are the fundamentals of this disclosure.

EXAMPLE 2

The sugar mixtures, high-fructose-corn-syrup (HFCS) as feed, is investigated by traditional chromatography to show the difference from the elution profile studied under new mass transfer method in next example. The feed solution has 60% dry substance, containing 44.1% of fructose, 51.0% glucose, and remaining 4.9% oligosaccharide. The column is 1.6-cm (I.D.)×40-cm (L) maintained at 75° C. by water circulation through column jacket. The resin filled in column is calcium base strongly acidic cation exchanger with mean particle size of 320 um±10 um. The resin filled in column has 80 cc of bed volume. The feed and de-ion water reservoir were jacked with 75° C. water circulation. The feed solution and eluent water was fed sequentially via a two-way valve from top of column by a reversible peristaltic pump, which is connected with a timer for precise 2 cc/min. volume input rate. Samples are collected at column outlet by every two-minute interval. The column is initially saturated with de-ion water and first input by four cc of feed solution, and then eluted by de-ion water, all input at 2 cc/min flow rate.

Figure 12:
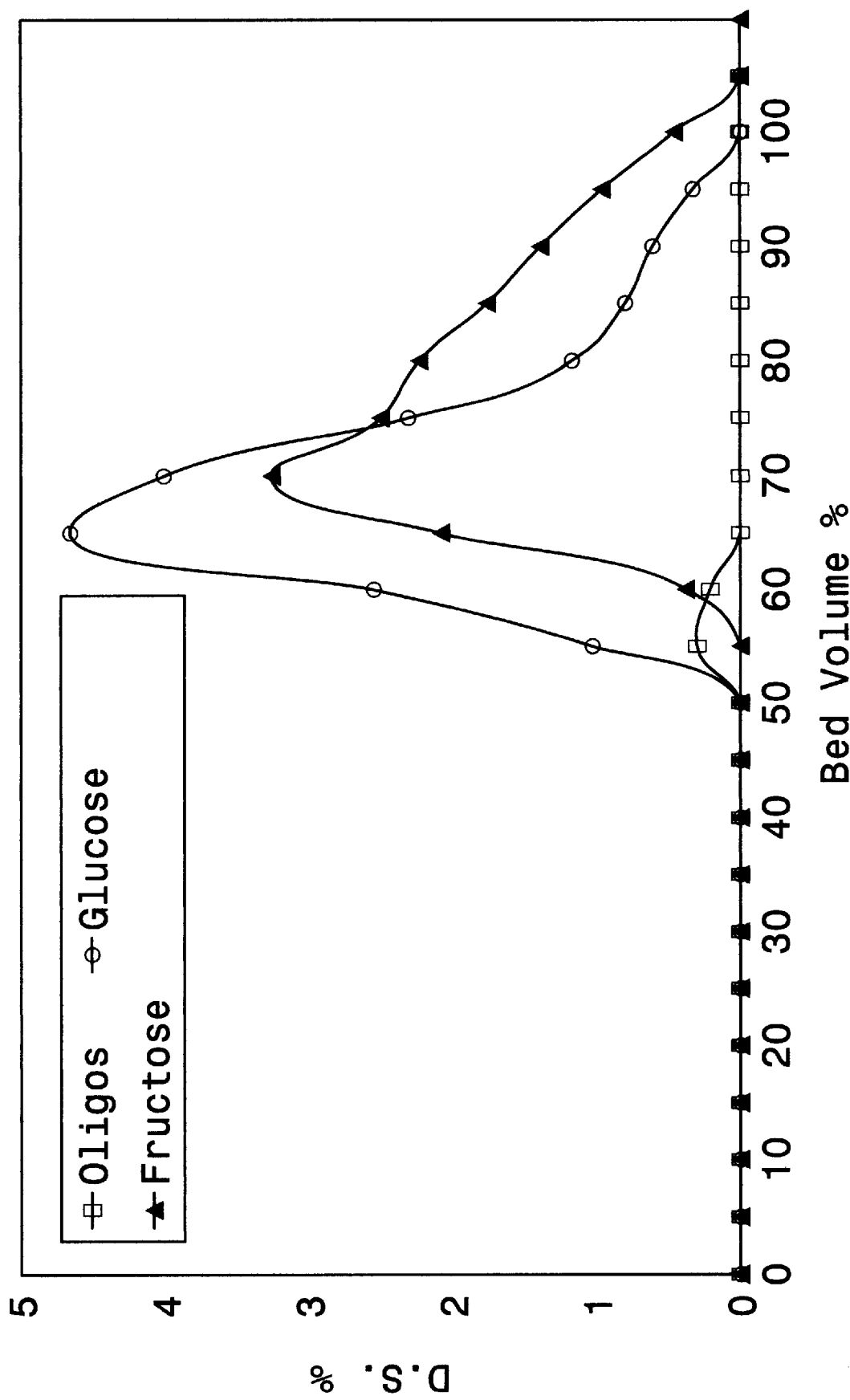
FIG. 12 is an elution profile of high-fructose corn syrup separated by chromatography and FIG. 13 is an elution profile of high-fructose corn syrup separated by new mass transfer method described in FIG. 3.

In FIG. 12, the elution profiles are plotted in D.S.% (dry substance) vs. B.V.% (bed volume) for oligosaccharide; abbreviated as oligos, glucose, and fructose. The sugar components start to elute after 50% of bed volume and end after onebed volume, a typical characteristic profile for chromatography. The sugar components are first adsorbed by resin and eluted by upcoming water. Oligos is the least retained ingredient among three components, thus eluted first. Followed is the glucose and then by fructose. Similar to the elution profile shown in FIG. 11, the glucose and fructose both have flat front profile and long tail; indicating the initial separation were deteriorated significantly by axial dispersion and diffusion. The elution-profile indicates the control parameters for this system is de-ion water and suggests the iso-point of glucose and fructose is very close to each other. Thus, the amount of water input for separation is critical. Note that total eluent water consumed is 88 cc that is equivalent to 110% resin bed volume, or consumed water to feed ratio is 22 for this example.

EXAMPLE 3

The same feed solution of HFCS was investigated under new mass transfer method to distinguish of mass transfer phenomena between this disclosure and chromatography. The feed and eluent reservoirs and cylindrical cell with dimension of 1.66-cm (I.D.)×195-cm (L) are jacked with 75° C. hot water circulation. The same resin, in semi-dry status, was filled with 406 cc in volume and having 185 cm in final abed height. As demonstrated in FIG. 3 that an approximate 10-cm open space is reserved between fluid inlet baffle and resin for creating partial fluidize effect. Unlike chromatography, the resin is always saturated with liquid. The semi-dry status means the resin may have wet surface and inter-particle's fluid is drained. The 21 inch-Hg vacuum is employed from bottom of the cell for continuous liquid draining. The bottom of the cell is equipped with thread on sample bottle, which is airtight and can be manually thread off to replace with new sample collection bottle. The fluid input was manually delivered by a liquid pipette to simulate the input S-I for both feed solution and eluent water.

Figure 13:
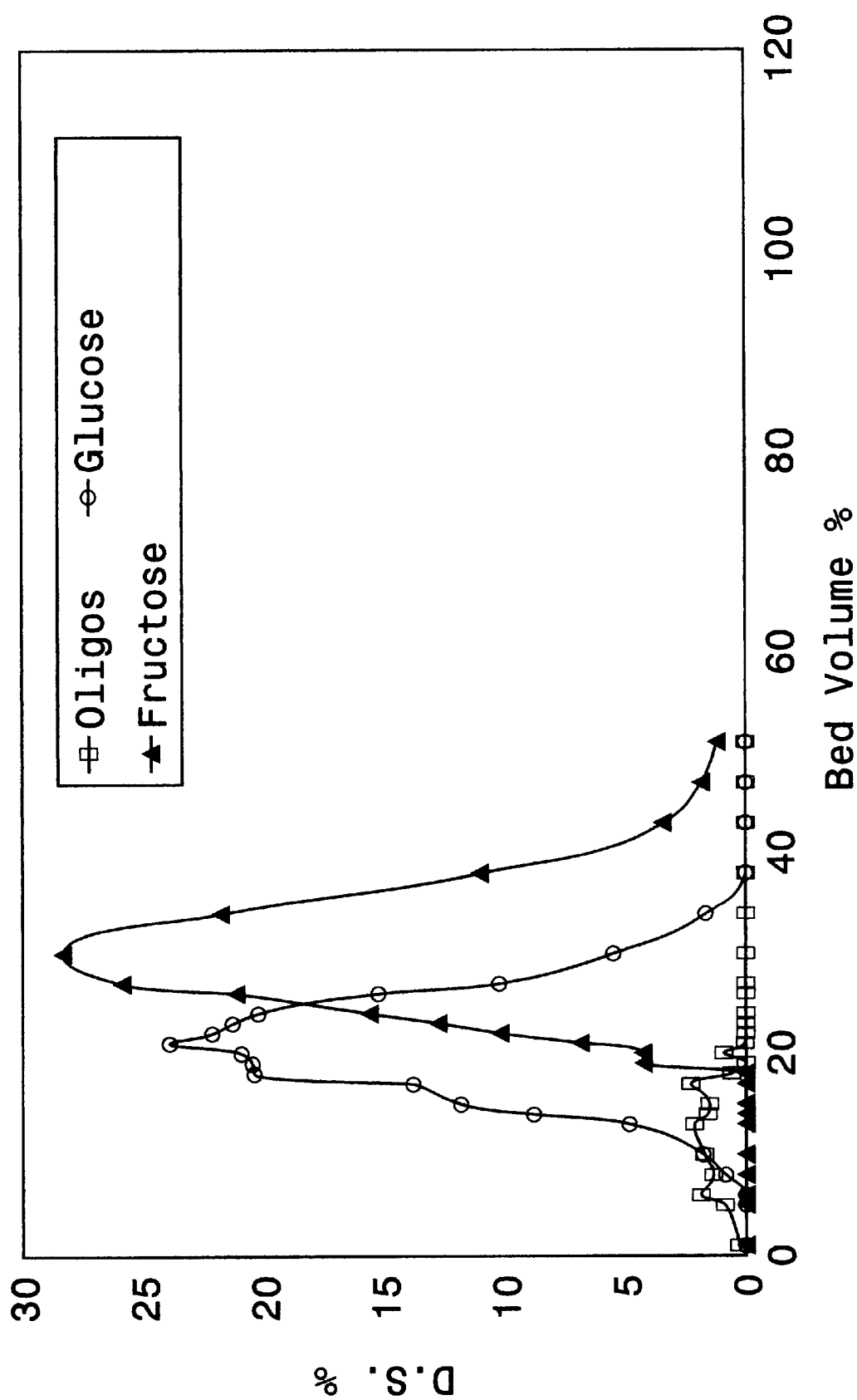

Total feed volume is 40 cc, equivalent to 0.1 bed volume of resin, is divided into 10 cc/dose via a quick pipette stroke and wait until 30 seconds are spent before next 10 cc is delivered. Total four pipette strokes are delivered within two minutes period, plus additional two minutes vacuum for draining. The fluid collected as sample #1 has 12 cc in volume, as shown in FIG. 13, which is virtually free of glucose, fructose, and only 0.29% D.S. of oligos. This first sample is 99.7% of water, which is the exchanged water when sugars are bounded onto the resin in mass transfer zone. This phenomenon is not been realized in traditional chromatography, mainly because the column is initially saturated with water and additional exchanged water cause sugar components return to mobile phase. Nevertheless, this is also the major distinction between this disclosure and chromatography in aspects of resin's adsorption capacity, which enable the same resin to increase its bonding capacity three to four folds under new mass transfer method.

After the loading is completed, eluent water is input by several formats of input S-I and samples are collected by every four minutes. Format #1 covers sample #2 to #5. Each water dose delivered is 0.7 cc and idled until ten seconds are spent before the next 0.7 cc is delivered. Total 8 doses are delivered within two minutes, which includes 40 seconds idled time. It then repeated with same input format for additional two-minute period. For simple notation, the input S-I can be denoted as ((0.7 cc/10 sec.)*8/2 mins)*2 with total 11.6 cc water input for four minutes period. Then, no water is delivered for sample #6. Repeat Format#1 for sample #7 and #8. Then, no water is delivered for #9. Format #2 covers sample #10 to #12, which is delivered as ((0.5 cc/10 sec.)*8/2 min)*2 for total 8 cc for every four minute period. Then, no water is delivered for #13. Same format #2 covers sample #14 to #16. Then, no water is delivered for #17. Format #3 covers sample #19 to 23, which is delivered as ((0.9 cc/10 sec.)*10/2 min)*2 for total 18 cc for every four-minute period. Then, no water is delivered for last sample #24. The summation of total water delivered is 229.2 cc, which is equivalent to 56.5% of resin bed volume, or consumed water to feed ratio is 5.73. As aforementioned characteristic elution of a single bed transformed in conjunction with the preferred apparatus that one revolution of a particular cell moving from loading to washing stage is equivalent to such elution profile. Thus, this example shall serve as the template, through which the preferred apparatus can be implemented. The major differences from chromatography, shown in FIG. 13, are the separation that starts from the very beginning and ends at 50% of bed volume, and exhibits much better separation between glucose and fructose. Table 1 below shows the averages concentration for mixtures of samples 5 to 13 and 19 to 24. The recovery of sugar is defined as the-weight of total sugar output vs. total sugar recovered. Note that the initial sugar weight in feed is 30.624 grams and total sugar recovered is 30.470 grams.

TABLE 1

| Sample | Total Output | Recovery % | Glucose % | Fructose % |
|---|---|---|---|---|
| 5 to 13 | 7.642 grams | 25 | 91 | 9 |
| 19 to 24 | 10.880 grams | 35.7 | 8 | 92 |

The recycle protocols are illustrated in the following examples for demonstration of efficient consumption of solid and mobile phase, and to concentrate the separated fractions while separation are not interrupted. Four cycles of single elution profiles are shown to simulate the actual separation cycle observed on preferred apparatus. The same bed used in example 3 is been used again and maintaining in semi-dry status as criterion of new mass transfer method. The hot water circulated in bed jacket is maintained at 80° C. The vacuum is constantly engaged at 27 inch-Hg vacuum. In these examples, the water vapor is recovered by passing the exit hot air through a condenser, jacketed with circulated cooling water, to condense the water vapor before entering the vacuum pump. All collected water from bottom of condenser is free of sugar residues and can be reused. The same feed solution applied, as input S-I for each cycle is 130 cc, equivalent to 0.32 resin bed volume. The eluent-water and recycled streams from previous cycle is also been delivered respectively as input S-I. All liquid input is manually delivered by pipette to simulate the input S-I. Soon after the liquid dose is delivered, the pressure air, about 100-psi, was released manually from the top of cell to affiliate the vacuum for quick liquid draining. In each run of four elution profiles described as template for apparatus; the number of steps, in accordance with the differential set-up between two phases, are 45 steps and each step or minimal time interval been counted for 30 seconds.

EXAMPLE 4

Figure 14:
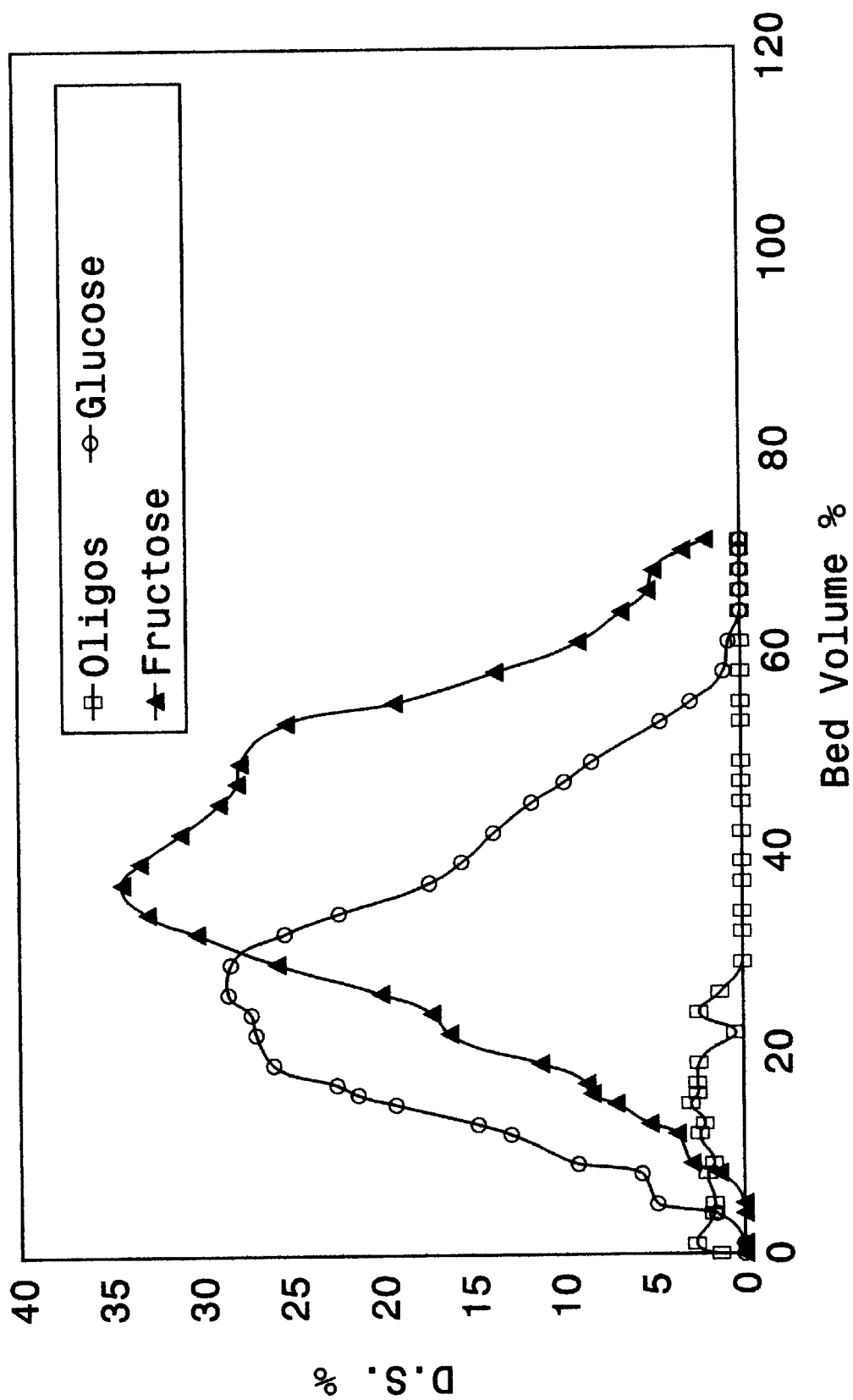
FIG. 14 through FIG. 17 are composed by four consecutive steps of recycle procedures to illustrate the advantages of employment of new mass transfer method and differential set-up.

For illustration of recycle protocol demonstrated in FIG. 9 and FIG. 10, the elution profile shown in FIG. 14 for separation of HFCS indicates as the first cycle in series of total four cycles. The input S-I for loading covers from sample #1 through #7. Sample #1 is by inputting 20 cc of feed and followed by pressure air to make up first 15 seconds. Then, it repeats additional 20 cc in next 15 seconds plus 90 seconds pressure air to make up total 40 cc feed in two-minute loading time. It can be denoted as ((20 cc/15 sec.)*2)*4, meaning this sample has 40 cc feed and counts for four minimal-time-intervals or, for 30 seconds each step. Total 24 cc of exchanged water is collected as sample #1 with similar results as for sample #1 in last example. Sample #2 is done by ((5 cc/5 sec.)*3)*1; meaning three of (5 cc/5 sec.) feed plus 15 seconds pressure air to count as one step for 30 seconds. Sample #3 is done by ((5 cc/5 sec.)*3)*3, which is counted as three steps for 90 seconds. The sample #2 and #3 counts for total four steps as one format. The four-step format is repeated for sample #4 and #5, and repeated for sample #6 and #7. Each group is counted as four steps. This concludes the total 16 steps of loading for total 130 cc of feed solution, which contains 99.528 grams of dry base sugar.

The eluent water starts from sample #8 to #31 with the same format of input S-I as ((4 cc/5 sec.)*3)*1, means each collected sample is counted as one step for 30 seconds, each having 12 cc of water input. Except sample #9 is ((4 cc/5sec.)*3)*3 for three steps. The complete water on has twenty-six steps with total 288 cc-water consumption. The samples #32 through #34 were collected by pressure air for one step per sample, to drain the remaining liquid and prepare the bed for next cycle. The condensed water collected from condenser is 36 cc to make net of 252 cc-water consumption. The table 2 shows the group of sample mixtures classified as zone 1 through zone 6 to cover samples #1 through #34. The mixtures of zone 2 and zone 3 will be considered as by-product abbreviated as BP, namely glucose enriched solution and fructose enriched solution. The mixture solutions in zone 4,5,6, and 1 will be recycled into the second cycle.

TABLE 2

| Zone | Sample No. | D.S. % | Oligos % | Glucose % | Fructose % | Volume, cc | Sugar, gm |
|---|---|---|---|---|---|---|---|
| 1 | 1–8 | 8.04 | 22.45 | 59.62 | 17.93 | 72 | 5.9555 |
| 2 | 9–16, BP | 40.13 | 7.02 | 58.9 | 34.08 | 54 | 25.1783 |
| 3 | 17–20, BP | 53.05 | 0 | 43.95 | 56.05 | 43 | 27.9737 |
| 4 | 21–25 | 41.97 | 0 | 29.24 | 70.76 | 50.3 | 24.7209 |
| 5 | 26–30 | 17.68 | 0 | 13.08 | 86.92 | 55 | 10.3609 |
| 6 | 31–34 | 3.21 | 0 | 0 | 100 | 29.5 | 0.9577 |

EXAMPLE 5

Figure 15:
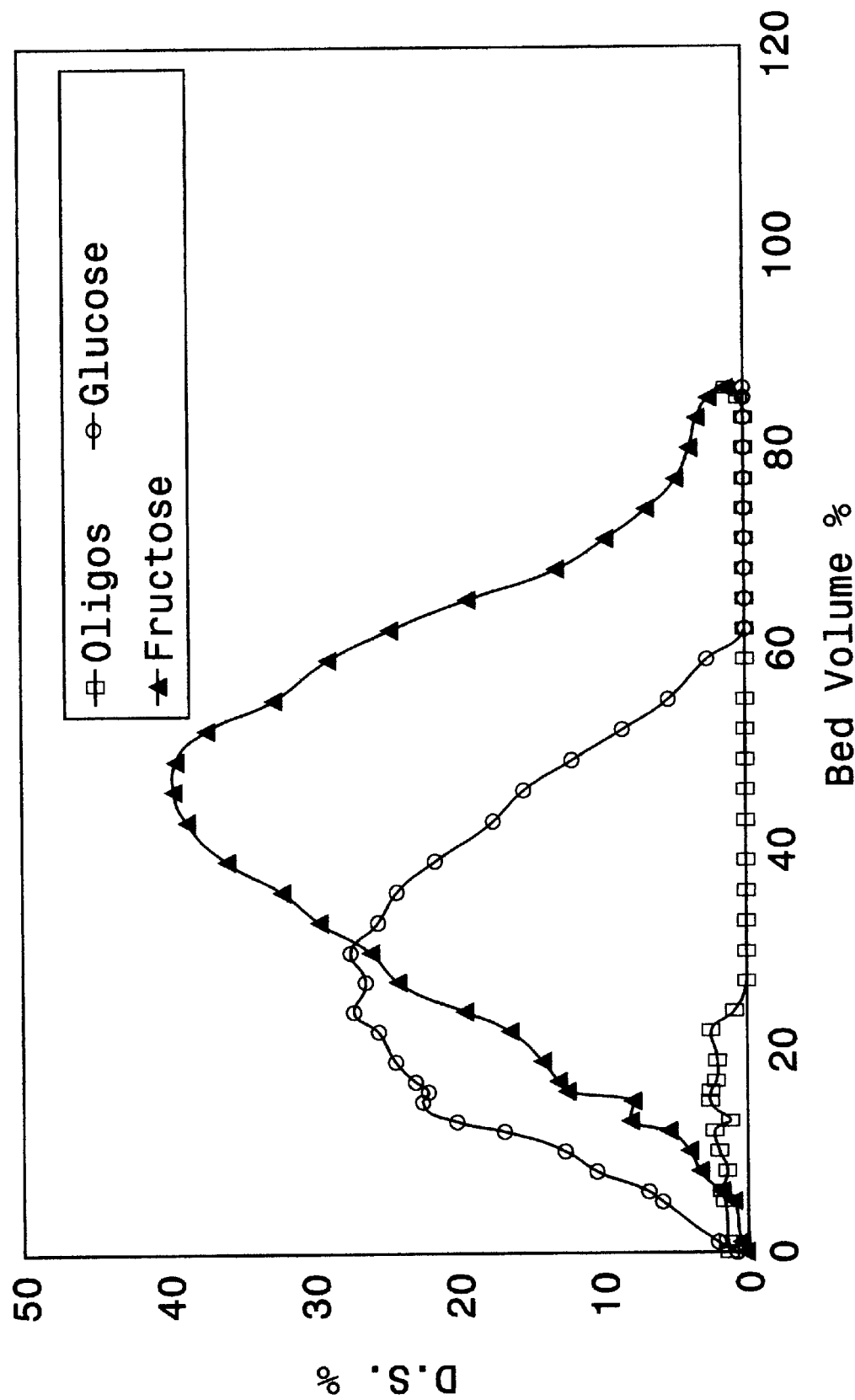

The elution profile of HFCS shown in FIG. 15 demonstrates the second cycle of recycle protocols. The input S-I format for loading stage for sample #1 is ((35 cc/15 sec.)*2)*4, which counts for four steps to input total 70 cc feed solution and collects 33 cc of exchanged water as sample #1. The sample #2 and #3 follow identical format as those in example 4, which are ((5 cc/5 sec)*3)*1 and ((5 cc/5 sec)*3)*3 to be counted as four-step format. The sample #4 and #5 repeat same four-step format to count for 30 cc feed. The loading stage delivers total 130 cc feed and spends six minutes for twelve steps or twelve minimal-time intervals.

The elution starts from the recycle stream of mixture (#21–25) of zone 4 shown in Table 2. The input S-I format for sample #6 is ((4.5 cc/5 sec)*3)*1 to count for one step of total 13.5 cc recycled solution. The sample #7 is ((4.5 cc/5 sec)*3)*3 to count for three steps. The sample #8 is ((4.5 cc/5 sec)*3)*1 for one step. The sample #9 is (4.5 cc/5 sec)*2 of solution from zone 4 and (4.5 cc/5 sec)*1 from zone 5 to make up total one step, due the solution:from zone 4 is finished. However, in actual operation of the preferred apparatus, this will not be happened. As enough solution will be accumulated in each zone's holding tank for cycling into next cycle. The sample #10 is ((4.5 cc/5 sec)*3)*1 for one step of total 13.5 cc recycle solution from zone 5. Samples #11 a through #12 are ((4.5 cc/5 sec)*3)*1 for each one step to total two steps. The sample #13 is (4.5 cc/5 sec)*2 of recycle from zone 5, due the solution is finished, plus (4.5 cc/5 sec)*1 from zone 6 to make up total one step of total 13.5 cc recycle solution. Samples #14 and #15 each has one step of recycle solution from zone 6. Samples #16 through 27 are ((4.5 cc/5 sec)*3)*1, each one has one step of 13.5 cc eluent water. The eluent water has total twelve steps to consume 162 cc in volume. Samples 28 through 32 are recycle solution from zone 1 of previous cycle, each one is ((4.5 cc/5 sec)*3)*1 of 13.5 cc solution. The samples #33 through #35 were collected by pressure air for one step to drain the remaining liquid. The condensed water collected from condenser is 27 cc to make net of 135 cc water-consumption. The table 3 shows the group of sample mixtures classified as zone 1 through zone 6 to cover samples #1 through #35. The mixtures of zone 2 and zone 3 will be considered as by-product abbreviated as BP, namely glucose enriched solution and fructose enriched solution. The mixture solutions in zone 4,5,6, and 1 will be recycled into the third cycle.

previous cycle. The complete loading stage delivers 130 cc feed and spent six minutes for total twelve steps or minimal-time intervals.

The formats of input S-I for sequence of recycled streams listed in table 3 of zone 4,5,6, and then eluent water, are identical to those illustrated in example 5 covering from samples #6 through #27. Except, the volume for each step is increased from 13.5 cc to 15 cc, i.e., ((4.5 cc/5 sec)*3)*1 to ((5 cc/5 sec.)*3)*1 for each step. The consumed volume of eluent water is 165 cc. The samples #28 through last sample #35 follows the same format as illustrated in example 5. The condensed water collected from condenser is 34 cc to make net of 131 cc water-consumption. The table 4 shows the group of sample mixtures classified as zone 1 through zone 6 to cover samples #1 through #35. The mixtures of zone 2 and zone 3 will be considered as by-product abbreviated as BP, namely glucose enriched solution and fructose enriched solution. The mixture solutions in zone 4,5,6, and 1 will be recycled into the last cycle.

TABLE 4

| Zone No. | Sample No. | D.S. % | Oligos % | Glucose % | Fructose % | Volume, cc | Sugar, gm |
|---|---|---|---|---|---|---|---|
| 1 | 1–4 | 8.56 | 24.86 | 60.27 | 14.87 | 76 | 6.7053 |
| 2 | 5–16, BP | 43.24 | 6.14 | 52.61 | 41.25 | 124 | 63.1133 |
| 3 | 17–20, BP | 55.64 | 0 | 29.1 | 70.9 | 61.5 | 42.4311 |
| 4 | 21–25 | 35.55 | 0 | 11.52 | 88.48 | 74 | 30.0189 |
| 5 | 26–30 | 10.24 | 0 | 0 | 100 | 65 | 6.9016 |
| 6 | 31–35 | 2.87 | 0 | 0 | 100 | 46 | 1.3335 |

EXAMPLE 7

Figure 17:
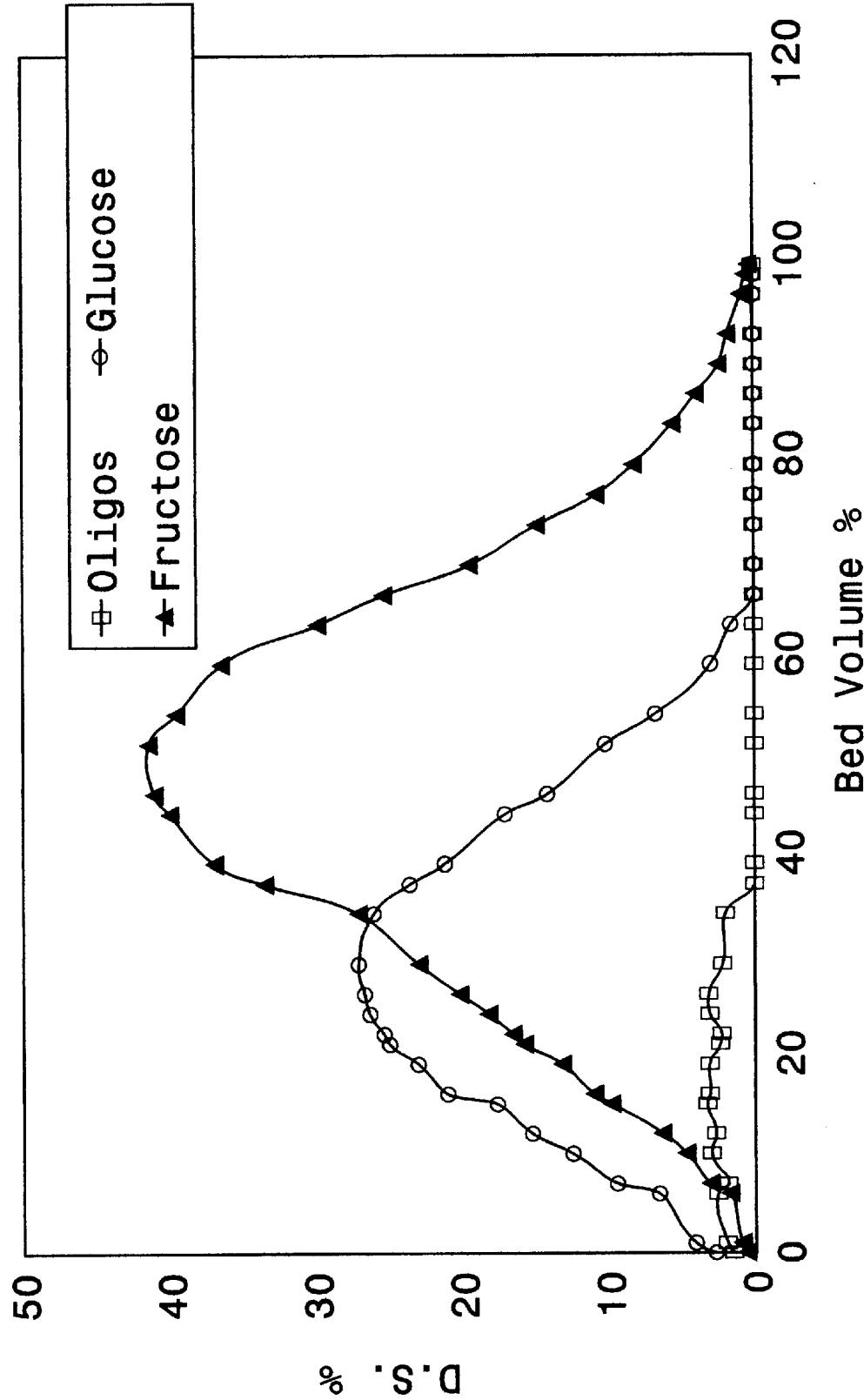

The elution profile shown in FIG. 17 demonstrates the last cycle of recycle protocols. The input S-I formats for sample #1 through #5 follow same formats as those in second cycle. The complete loading stage delivers 130 cc feed and spent six minutes for total twelve steps or minimal-time intervals.

The formats of input S-I, the sequence of recycle streams, listed in table 4 of zone 4,5,6, eluent water, and zone 1, follows the same as those illustrated in last example covering from samples #6 through the last sample #35. The volume for each step is 15 cc, which is delivered as ((5 cc/5 sec.)*3)*1 for each step. The consumed volume of eluent water is 145 cc. The condensed water collected from con-

TABLE 3

| Zone | Sample No. | D.S. % | Oligos % | Glucose % | Fructose % | Volume, cc | Sugar, gm |
|---|---|---|---|---|---|---|---|
| 1 | 1–6 | 8.77 | 18.17 | 62.07 | 19.76 | 70 | 6.3318 |
| 2 | 7–16, BP | 41.42 | 5.96 | 55.51 | 38.53 | 84 | 40.6519 |
| 3 | 17–20, BP | 57.21 | 0 | 39.51 | 60.49 | 49 | 34.9991 |
| 4 | 21–25 | 44.56 | 0 | 20.55 | 79.45 | 65 | 34.2789 |
| 5 | 26–30 | 16.27 | 0 | 0 | 100 | 60 | 10.3477 |
| 6 | 31–35 | 4.54 | 0 | 0 | 100 | 45.5 | 2.0988 |

EXAMPLE 6

Figure 16:
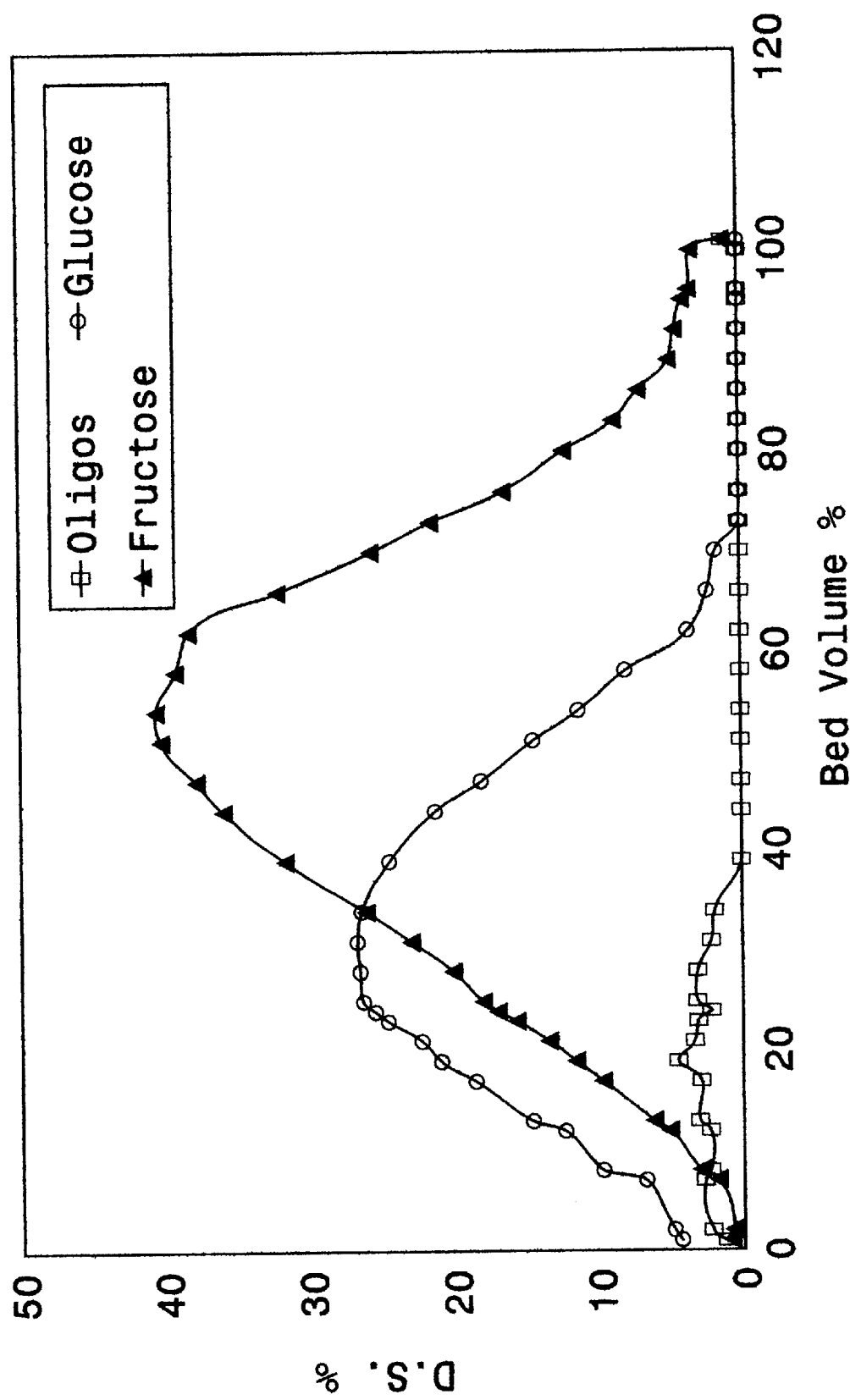

The elution profile shown in FIG. 16 demonstrates of third cycle of recycle protocols. The input S-I formats for sample #1 through #5 follow same formats as those demonstrated in denser is 35 cc to make net of 110 cc water-consumption. The table 5 shows the groups of sample mixtures classified as zone 1 through zone 6 to cover samples #1 through #35, considering as various products and by-products (BP).

TABLE 5

| Zone | Sample No. | D.S. % | Oligos % | Glucose % | Fructose % | Volume, cc | Sugar, gm |
|---|---|---|---|---|---|---|---|
| 1 | 1–4 | 8.22 | 29.12 | 57.79 | 13.09 | 74.5 | 6.3039 |
| 2 | 5–16, BP | 43.09 | 6.73 | 51 | 42.27 | 121 | 61.3310 |
| 3 | 17–20, BP | 55.16 | 0 | 22.47 | 77.53 | 55.3 | 37.7480 |
| 4 | 21–25 | 33.73 | 0 | 9.2 | 90.8 | 74 | 28.2774 |
| 5 | 26–30 | 10.02 | 0 | 0 | 100 | 68 | 7.0596 |
| 6 | 31–35 | 4.21 | 0 | 0 | 100 | 50 | 2.1364 |

The collected mixtures in zone 4,5, 6, and 1 will be considered as the output that can be treated for further usage. The mixture of zone 2 will be considered as glucose enriched solution and combined with solutions already mixed from previous three cycles. While, the mixture from zone 3 will be considered as fructose enriched solution and combined with solution already mixed from the previous three cycles. The table 6 summarizes the mixtures of zone 2 and zone 3 for cycle one through cycle four.

TABLE 6

| Zone no. | D.S. % | Oligos % | Glucose % | Fructose % | Volume, cc | Sugar, gms. |
|---|---|---|---|---|---|---|
| 2 | 40.5 | 6.84 | 52.89 | 40.27 | 383 | 180.5539 |
| 3 | 53.88 | 0 | 35 | 65 | 208.8 | 138.4555 |

The summation of consumed water for total four cycles is 760 cc with subtraction of condensed water 132 cc to make the net consumed water is 628 cc. The total of feed solution is 520 cc. Thus, the ratio of water consumed to feed input is 1.21. The table 7 summarizes the finalized information for cycle one through cycle four of recycle protocols.

TABLE 7

| Cycle No. | 1 | 2 | 3 | 4 |
|---|---|---|---|---|
| Total steps | 45 | 45 | 45 | 45 |
| Input sugar, gm. | 99.528 | 135.5675 | 151.8367 | 143.8882 |
| Output Sugar, gm. | 97.6639 | 127.9785 | 150.188 | 141.4285 |
| Recovery % | 98.13 | 94.4 | 98.91 | 98.29 |
| Wt. over 90% fructose | 11.7175 | 29.5549 | 48.8862 | 46.704 |
| Glucose % | 9.9 | 8.9 | 10.2 | 9.2 |
| Fructose % | 90.1 | 91.1 | 89.8 | 90.8 |
| 90% fructose recovery | 12% | 23.1% | 32.55% | 33.02% |

EXAMPLE 8

Figure 18:
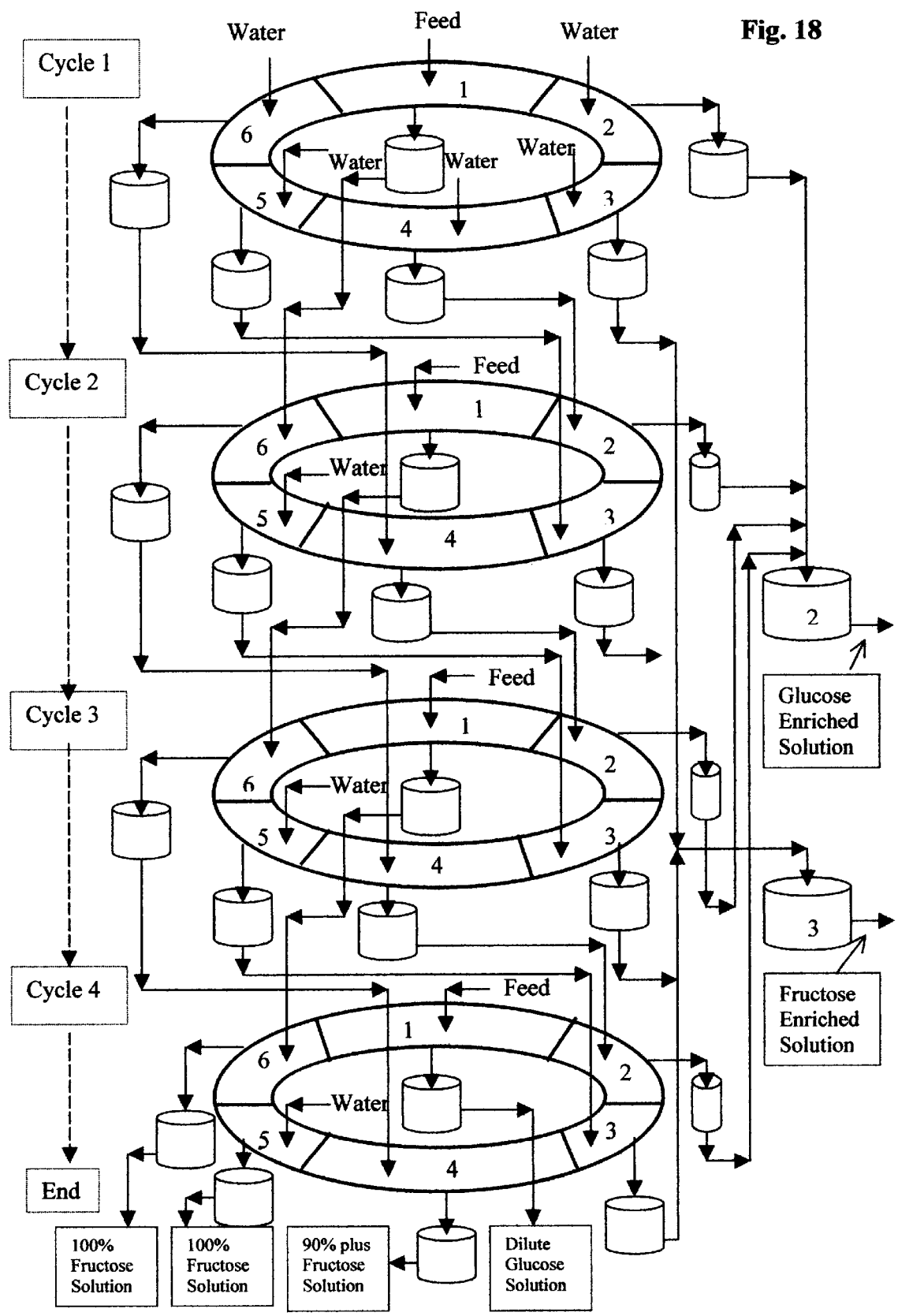
FIG. 18 is the schematic flow diagram for demonstrating the recycle protocol through which the comparison of resin stock, eluent water consumption, and product recovery been evaluated between the chromatography and present disclosure.

The FIG. 18 demonstrates the reiterated flow path of liquid streams. As previous illustration of differential set-up between two phases and new mass transfer method, each apparatus is the template to finalize the execution the predetermined elution profile and each separation cycle is completed within every spent of minimal time interval. The flow passages of various liquids and corresponding volume simultaneously delivered into each cell of different cycles is derived from the elution profile via said differential set-up between two phases, of which illustrated in example 4 through example 7. Four units of preferred apparatus arranged in series to denote each cycle; having each unit arranged to have said forty-five steps, or forty-five minimal-time intervals, to cover six zones. The table 8 summarizes the number of steps in each zone for each cycle that are the number of cells or group of cells installed in each zone of each apparatus.

TABLE 8

| No. of steps in | Cycle 1 | Cycle 2 | Cycle 3 | Cycle 4 |
|---|---|---|---|---|
| Zone 1 | 16 | 12 | 12 | 12 |
| Zone 2 | 10 | 14 | 14 | 14 |

TABLE 8-continued

| No. of steps in | Cycle 1 | Cycle 2 | Cycle 3 | Cycle 4 |
|---|---|---|---|---|
| Zone 3 | 4 | 4 | 4 | 4 |
| Zone 4 | 5 | 5 | 5 | 5 |
| Zone 5 | 5 | 5 | 5 | 5 |
| Zone 6 | 5 | 5 | 5 | 5 |

Each cycle needs to spend the said procedures of startup stage for steady state operation. At steady state operation, each unit is independent from each other, and yet, the integration from unit one through unit four via holding tanks and line connections, exhibits a continuous separation process including concentration enhancement of separated fractions. The zone 1 of each cycle is simultaneously input with predetermined feed solution and summation of all liquid volume is equivalent to the throughput requirement. The zone 2, 3, 4, 5, and 6 of cycle 1 and each corresponding zone 5 in cycle 2,3 and 4, are simultaneously input with eluent water. The current cycle means cycle one through cycle three and next cycle means next cycle of specific current cycle, individually. The output of each zone 1 in current cycle is simultaneously recycled as input for zone 6 in next cycle. The output of zone 4,5 and 6 from current cycle are simultaneously recycled as input into zone 2,3, and 4 of next cycle. The output of zone 2 and zone 3 collected from cycle 1 through 4 are mixed as glucose enriched solution and fructose enriched solution, respectively.

In the last cycle 4, the output collected from zone 5 and 6 is product of 100% fructose respectively. The output collected from zone 4 is 90%, or plus, fructose solution. The output collected from zone 1 is diluted glucose solution, which contains the majority of oligosaccharide original in feed solution. Alternatively, the dilute glucose solution can be recycled for zone 6 of cycle one to replace water elution for water conservation. The information of all products obtained under these specific running conditions is tabulated in table 5,6 and 7, which are purposely used for the demonstration of recycle protocols. However, the application of the recycle protocols achieves the superiority of better efficiency in separation of HFCS than the present chromatography process is governed within the general scope of this disclosure either. The comparison between the present disclosure and chromatography process is focused on recovery percentage, resin and eluent water consumption based on the same feed input rate.

The design summary of current chromatography process for handling 200 gallons per minute throughput consumes total 123,420 gallons resin. The feed solution is same composition as feed applied in previous examples. There have four columns; each column is 14 feet in diameter and 27.5 feet in height, loading with 4125 cubic-ft that is equal to 30,855 gallons per column, or, 123,420 gallons total resin consumption. The process requires the input-rate of 350 gallons per minute eluent water to receive 88% product recovery.

Shown as following, the resin consumption for the separation of HFCS of present disclosure is calculated based same throughput requirement and the results obtained from cycle 1 through cycle 4 of earlier illustrated examples. Note that the 0.32 is the ratio of input feed volume to resin bed volume for all four cycles illustrated previously.

Total steps in loading stage is 12 steps, each step is 30 seconds. Except for cycle-one has sixteen steps, but cycle 1 has same forty-five steps as other cycles. Actually, each unit in series of four cycles is independent from each other and communicated via holding tanks and pipelines among individual zones and cycles. Thus, a 200 gal./min. throughput will be evenly divided by four cycles, which are 50 gal./min/cycle or 25 gal./30 sec./cycle. Thirty seconds is the predetermined minimal time interval. The feed volume delivered for each cell in each cycle is 2.083 gal./step, or 2.083 gal./30 seconds into each cell in loading zone. The resin loaded into each cell in the loading zone is (2.083/0.32)*12/step, or, 78.113 gal./cell to cover 12 steps for loading zone in each cycle. Thus, the resin inventory is 78.113*45, which is equivalent to 3515.09 gallons per cycle. Four cycles of the recycle protocols will consume 3515.09*4, which is 14,060.36 gallons. In comparison to the earlier summary of chromatography process, it requires 123,420 gallons resin stock. The present disclosure represented by the running conditions shown in previous examples takes only 11.4% of such resin stock to handle same capacity requirement. Furthermore, the feed to eluent water ratio shown in example 7 is 1.21. Therefore, the present disclosure will consume 242 gallons per minute of eluent water base on 200 gallons feed throughput. As shown in table 7, the average recovery percentage from cycle 1 through cycle 4 is 97.41% compare to 88% from chromatography process. Note that the feed solution is 60% in dry solid base, which is same as chromatography process.

I claim:

1. A method for separating a plurality of components contained in a first mobile phase comprising a liquid solution of said components by contacting a solid phase packing material with the first mobile phase, so that the components are adsorbed by the solid phase material, and subsequently contacting the solid phase with at least a second and third mobile phase in sequence, each of the second and third mobile phases comprising a liquid eluent of predetermined composition such that at least two of the components are separately desorbed from the solid phase by the second and third mobile phases, and wherein the solid phase is contained and in contact with the wall of a cell having an inlet on one side of the solid phase packing material and an outlet on another side of the solid phase packing material; by starting with said first mobile phase material until the solid phase is loaded with the components of the first mobile phase, the method comprising:

(a) intermittently delivering predetermined amounts of said first mobile phase material to the inlet of the cell;

(b) intermittently supplying pressurized gas to the cell on the one side of the solid phase packing material following each delivery of said first mobile phase to the inlet of the cell in step (a) for increasing the flow rate of the mobile phase through the solid phase packing material;

(c) maintaining a vacuum on the other side of the solid phase packing material so as to maintain the solid phase packing material in a semi-dry state during steps (a) and (b);

(d) intermittently collecting a remaining portion of each delivered amount of said first mobile phase from the outlet of the cell after passage through the solid phase packing material;

after the predetermined amounts of said first mobile phase material are intermittently delivered, (e) intermittently delivering predetermined amounts of said second mobile phase material to the inlet of the cells;

(f) intermittently supplying pressurized gas to the cell on the one side of the solid phase packing material following each delivery of said second mobile phase to the inlet of the cell in step (e) for increasing the flow rate of the mobile phase through the solid phase packing material;

(g) maintaining a vacuum on the other side of the solid phase packing material so as to maintain the solid phase packing material in a semi-dry state during steps (e) and (f);

(h) intermittently collecting a remaining portion of each delivered amount of said second mobile phase from the outlet of the cell after passage through the solid phase packing material;

after the predetermined amounts of said second mobile phase material are intermittently delivered, then;

(i) intermittently delivering predetermined amounts of said third mobile phase material to the inlet of the cell;

(j) intermittently supplying pressurized gas to the cell on the one side of the solid phase packing material followings each delivery of said third mobile phase to the inlet of the cell in step (i) for increasing the flow rate of the mobile phase through the solid phase packing material;

(k) maintaining a vacuum on the other side of the solid phase packing material so as to maintain the solid phase packing material in a semi-dry state during steps (i) and (j);

(l) intermittently collecting a remaining portion of each delivered amount of said third mobile phase from the outlet of the cell after passage through the solid phase packing material.

2. The method of claim 1 wherein each intermittent delivery of mobile phase in steps (a), (e), and (i) comprise delivering the respective mobile phase for a first time period, each intermittent supplying pressurized gas in steps (b), (f), and (j) comprise supplying pressurized gas for a second time period immediately following the corresponding first time period, and each intermittent collection of mobile phase in steps (d), (h), and (l) comprise collecting the respective mobile phase for a third time period immediately following the corresponding second time period; and wherein the sum of the first, second, and third time periods defines a minimal time interval, $\Delta t$.

3. The method of claim 2 wherein the solid phase packing material is a particulate material retained on a porous mesh screen.

4. The method of claim 3 wherein the inlet of the cell is above the outlet, and wherein steps (a), (e), and (i) comprise intermittently delivering the predetermined amounts of the respective mobile phase to slide downward along the wall of the cell to uplift the particulate material to form a partially fluidized bed effect for instantaneous and homogeneous mass transfer contact between said predetermined amount of the respective mobile phase and said solid phase packing material, wherein steps (b), (f), and (j) comprise force draining of delivered respective mobile phase through said solid phase packing material, and wherein the mass transfer contact is carried out during each sum of the first time period and the second time period.

5. The method of claim 1 wherein the solid phase packing material is a particulate ion-exchange resin.

6. A method for separating one component from a liquid phase feed solution containing said one component mixed with at least one other component by sorption and desorption from a permeable adsorbent solid phase packing material, each component having a different iso-point equilibrium state at which the adsorbed component starts to desorb from the solid phase packing material so that desorption of individual components occurs sequentially, wherein the permeable adsorbent solid phase packing material is contained and in contact with wall of at least one container that has an inlet on one side of the solid phase packing material and an outlet on another side of the solid phase packing material, and wherein at least one particular pressure level is applied respectively onto a surrounding space of the inlet and outlet of the container for liquid drainage, the method comprising:

providing a predetermined amount of the permeable adsorbent solid phase packing material in at least one container in a semi-dry condition, wherein semi-dry condition is defined as the packing material having wet surfaces but with no liquid filling interstices of the material, delivering a preselected amount of said feed solution onto the packing material in multiple intermittent increments so that components dissolved in the solution are adsorbed by the packing material, simultaneously draining solvent from each delivered increment of feed solution from the packing material while maintaining a vacuum at the outlet of the container so as to maintain the packing material at all times in said semi-dry condition, delivering a selected amount of a at least one eluting liquid having a particular mobile phase composition onto the packing material in multiple intermittent increments so that components of the liquid phase feed solution adsorbed by the material are sequentially desorbed from the packing material into the increments of eluting liquid, simultaneously draining each solute-containing increment of eluting liquid from the packing material while maintaining a vacuum at the outlet of the container so as to maintain the material at all times in said semi-dry condition, and collecting increments of drained eluting liquid containing desorbed amounts of said one component separately from increments of drained solvent and drained eluting liquid containing desorbed amounts of said at least one other component.

7. The method of claim 6 wherein the predetermined amount of permeable solid phase packing material is an amount to completely adsorb at least said one component dissolved in the preselected amount of feed solution.

8. The method of claim 7 wherein the predetermined amount of permeable solid phase packing material is an amount to completely adsorb all of the components dissolved in the preselected amount of feed solution.

9. The method of claim 6 wherein the surrounding space of liquid drained from the packing material is maintained at lower pressure than the surrounding space of liquid delivered onto the packing material, so as to shorten the drainage time of each delivered liquid increment and facilitate maintaining the packing material in a semi-dry condition.

10. The method of claim 9 wherein the surrounding space of liquid drained from the packing material is maintained under vacuum.

11. The method of claim 6 wherein the pressure of the surrounding space of liquid delivered onto the packing material is increased after each delivered increment of liquid.

12. The method of claim 6 wherein the surrounding space of liquid drained from the packing material is maintained under vacuum, and the pressure of the surrounding space of liquid delivered onto the packing material is increased after each delivered increment of liquid, so as to shorten the drainage time of each delivered liquid increment and facilitate maintaining the packing material in a semi-dry condition.

13. The method of claim 6 wherein the permeable adsorbent solid phase packing material is a particulate adsorbent resin.

14. The method of claim 13 wherein each increment of feed solution is splashed in an umbrella shape that hits the container wall and slides downward to penetrate and partially uplift the particles of resin suspended in liquid to obtain quick contact and to reduce time for mass transfer between the delivered liquid and resin.

15. The method of claim 14 wherein each increment of eluting liquid is splashed in an umbrella shape that hits the container wall and slides downward to penetrate and partially uplift the particles of resin suspended in liquid to obtain quick contact and to reduce time for mass transfer between the delivered liquid and resin.

16. The method of claim 6 wherein said at least one other component in the feed solution comprises a first other component having an iso-point that is before the iso-point of said one component, wherein the iso-point is defined as an equilibrium state that a particulate mobile phase composition interacts with an adsorbed component, among said one component and at least one other component that have been adsorbed by the solid phase packing material, at which such an adsorbed component starts to desorb from the solid phase packing material, so that desorption of an individual component occurs sequentially with different predetermined composition of mobile phase; and said at least one eluting liquid comprises a first eluting liquid, having a preset mobile phase composition prior to the iso-point of said one component that can desorb said first other component, and a second eluting liquid, having a preset mobile phase composition that just elutes said one component, and a preselected amount of the first eluting liquid is delivered before delivering a preselected amount of the second eluting liquid.

17. The method of claim 16 wherein said at least one other component in the feed solution comprises a second other component having an iso-point that is after the iso-point of said one component, wherein the iso-point is defined as an equilibrium state that a particulate mobile phase composition interacts with an adsorbed component, among said one component and at least one other component that have been adsorbed by the solid phase packing material, at which such an adsorbed component starts to desorb from the solid phase packing material, so that desorption of an individual component occurs sequentially with different predetermined composition of mobile phase; and said at least one eluting liquid comprises a third eluting liquid, having a preset mobile phase composition after the iso-point of said one component that can desorb said second other component, and a preselected amount of the third eluting liquid is delivered after delivering the preselected amount of the second eluting liquid.

18. The method of claim 17 wherein the preselected amount of the first elution liquid accomplishes elution of said first other component from the packing material, the preselected amount of the second elution liquid accomplishes elution of said one component from the packing material, and the preselected amount of the third elution liquid accomplishes elution of said second other component from the packing material.

19. The method of claim 6, wherein the method further comprises:

after completing collecting increments of drained eluting liquid containing desorbed amounts of said one component separately from increments of drained solvent and drained eluting liquid containing desorbed amounts of said at least one other component, delivering a preselected amount of drained solvent collected from the previously delivered increments of feed solution onto the packing material to wash the material in preparation for another operation cycle.

20. The method of claim 6 wherein the surrounding space of liquid drained from the packing material and the surrounding space of liquid delivered onto the packing material are maintained at equal pressure and the delivered liquid is drained by gravity, so as to maintain the packing material in a semi-dry condition.

21. The method of claim 6 wherein the solid phase packing material is a particulate ion-exchange resin.

* * * * *